(12) United States Patent
Utschig-Utschig et al.

(10) Patent No.: US 8,869,108 B2
(45) Date of Patent: Oct. 21, 2014

(54) TECHNIQUES RELATED TO CUSTOMIZATIONS FOR COMPOSITE APPLICATIONS

(75) Inventors: Clemens Utschig-Utschig, San Francisco, CA (US); Khanderao Kand, San Jose, CA (US); Avi Borthakur, Belmont, CA (US); Albert Tam, Burlingame, CA (US); Prabhu Thukkaram, San Ramon, CA (US); Qing Zhong, Fremont, CA (US); Greg Pavlik, Danville, CA (US)

(73) Assignee: Oracle International Corporation, Redwood Shores, CA (US)

( * ) Notice: Subject to any disclaimer, the term of this patent is extended or adjusted under 35 U.S.C. 154(b) by 815 days.

(21) Appl. No.: 12/790,437

(22) Filed: May 28, 2010

(65) Prior Publication Data

US 2011/0119651 A1    May 19, 2011

Related U.S. Application Data

(60) Provisional application No. 61/262,458, filed on Nov. 18, 2009.

(51) Int. Cl.
G06F 9/44 (2006.01)

(52) U.S. Cl.
CPC ... G06F 8/35 (2013.01); G06F 8/71 (2013.01)
USPC ............ 717/120; 717/118; 717/119; 717/121

(58) Field of Classification Search
None
See application file for complete search history.

(56) References Cited

U.S. PATENT DOCUMENTS

| | | | |
|---|---|---|---|
| 5,790,778 A | 8/1998 | Bush et al. | |
| 5,850,518 A | 12/1998 | Northrup | |
| 6,117,180 A | 9/2000 | Dave et al. | |
| 6,138,270 A | 10/2000 | Hsu | |
| 6,397,254 B1 | 5/2002 | Northrup | |
| 6,401,134 B1 | 6/2002 | Razavi et al. | |
| 6,421,705 B1 | 7/2002 | Northrup | |
| 6,442,751 B1 | 8/2002 | Cocchi et al. | |
| 6,487,713 B1 * | 11/2002 | Cohen et al. | 717/105 |
| 6,546,413 B1 | 4/2003 | Northrup | |
| 6,601,233 B1 * | 7/2003 | Underwood | 717/102 |
| 6,641,746 B2 | 11/2003 | Houge et al. | |
| 6,671,713 B2 | 12/2003 | Northrup | |
| 6,671,746 B1 | 12/2003 | Northrup | |
| 6,779,000 B1 | 8/2004 | Northrup | |
| 6,807,636 B2 | 10/2004 | Hartman et al. | |
| 6,901,580 B2 * | 5/2005 | Iwanojko et al. | 717/121 |
| 6,922,675 B1 | 7/2005 | Chatterjee et al. | |
| 6,922,705 B1 | 7/2005 | Northrup | |
| 6,947,992 B1 | 9/2005 | Shachor | |

(Continued)

OTHER PUBLICATIONS

"Defining Composite Configurable SaaS Application Packages Using SCA Variability Descriptors and Multi-Tenancy Patters", by Mietzner et al., pp. 156-161, 2008.*

(Continued)

*Primary Examiner* — Isaac T Tecklu
(74) *Attorney, Agent, or Firm* — Kilpatrick Townsend & Stockton LLP

(57) ABSTRACT

A framework is provided for enabling and managing customizations to an application. In one embodiment, techniques are provided that enable the customizability of an application to be controlled based upon hierarchical relations between elements of the application.

20 Claims, 19 Drawing Sheets

(56) References Cited

U.S. PATENT DOCUMENTS

| | | | |
|---|---|---|---|
| 6,954,792 B2 | 10/2005 | Kang et al. | |
| 7,028,019 B2* | 4/2006 | McMillan et al. | 707/691 |
| 7,062,749 B2 | 6/2006 | Cyr et al. | |
| 7,086,009 B2* | 8/2006 | Resnick et al. | 715/771 |
| 7,188,158 B1 | 3/2007 | Stanton et al. | |
| 7,203,938 B2* | 4/2007 | Ambrose et al. | 717/170 |
| 7,343,360 B1 | 3/2008 | Ristanovic et al. | |
| 7,349,913 B2* | 3/2008 | Clark et al. | 1/1 |
| 7,535,927 B1 | 5/2009 | Northrup | |
| 7,536,606 B2 | 5/2009 | Andrews et al. | |
| 7,584,207 B2* | 9/2009 | Mortensen et al. | 1/1 |
| 7,603,674 B2 | 10/2009 | Cyr et al. | |
| 7,644,262 B1* | 1/2010 | Bromley et al. | 713/1 |
| 7,693,851 B2 | 4/2010 | Beckaer | |
| 7,721,158 B2* | 5/2010 | Lee | 714/48 |
| 7,774,477 B2 | 8/2010 | Zintel et al. | |
| 7,783,782 B2 | 8/2010 | Cromp et al. | |
| 7,788,338 B2 | 8/2010 | Savchenko et al. | |
| 7,793,340 B2 | 9/2010 | Kiester et al. | |
| 7,827,494 B1 | 11/2010 | Hedayatpour et al. | |
| 7,840,941 B2* | 11/2010 | Brookins et al. | 717/121 |
| 7,853,899 B1 | 12/2010 | Damaschke et al. | |
| 7,865,544 B2 | 1/2011 | Kordun et al. | |
| 7,895,512 B2 | 2/2011 | Roberts | |
| 7,933,946 B2 | 4/2011 | Livshits et al. | |
| 7,945,907 B2* | 5/2011 | Dreiling et al. | 717/168 |
| 7,950,424 B2 | 5/2011 | Ozanne et al. | |
| 7,984,424 B2 | 7/2011 | Dengler et al. | |
| 7,992,130 B2 | 8/2011 | Bozza et al. | |
| 8,015,545 B2* | 9/2011 | Seto et al. | 717/108 |
| 8,074,214 B2* | 12/2011 | Isaacson et al. | 717/173 |
| 8,108,825 B2* | 1/2012 | Goodwin et al. | 717/104 |
| 8,209,675 B2* | 6/2012 | Zhao et al. | 717/168 |
| 8,271,609 B2 | 9/2012 | Addala et al. | |
| 8,332,654 B2 | 12/2012 | Anbuselvan | |
| 8,538,998 B2 | 9/2013 | Barrow | |
| 8,560,938 B2 | 10/2013 | Barrow et al. | |
| 8,667,031 B2 | 3/2014 | Konduri et al. | |
| 2002/0023140 A1 | 2/2002 | Hile et al. | |
| 2002/0103660 A1 | 8/2002 | Cramon et al. | |
| 2002/0129060 A1 | 9/2002 | Rollins et al. | |
| 2002/0143735 A1 | 10/2002 | Ayi et al. | |
| 2002/0147757 A1 | 10/2002 | Day et al. | |
| 2002/0188613 A1 | 12/2002 | Chakraborty et al. | |
| 2003/0005117 A1 | 1/2003 | Kang et al. | |
| 2003/0025732 A1 | 2/2003 | Prichard | |
| 2003/0033310 A1 | 2/2003 | Factor et al. | |
| 2003/0034989 A1 | 2/2003 | Kondo | |
| 2003/0084424 A1 | 5/2003 | Reddy et al. | |
| 2003/0088857 A1* | 5/2003 | Balva et al. | 717/137 |
| 2003/0172127 A1 | 9/2003 | Northrup | |
| 2003/0172168 A1 | 9/2003 | Mak et al. | |
| 2003/0172193 A1 | 9/2003 | Olsen | |
| 2003/0192031 A1 | 10/2003 | Srinivasan et al. | |
| 2003/0204518 A1 | 10/2003 | Lang et al. | |
| 2003/0204645 A1 | 10/2003 | Sharma et al. | |
| 2003/0233631 A1 | 12/2003 | Curry et al. | |
| 2003/0233642 A1 | 12/2003 | Hank | |
| 2004/0046787 A1 | 3/2004 | Henry et al. | |
| 2004/0046789 A1 | 3/2004 | Inanoria | |
| 2004/0054991 A1 | 3/2004 | Harres | |
| 2004/0073565 A1 | 4/2004 | Kaufman et al. | |
| 2004/0078424 A1 | 4/2004 | Yairi et al. | |
| 2004/0111533 A1 | 6/2004 | Beisiegel et al. | |
| 2004/0111673 A1 | 6/2004 | Bowman et al. | |
| 2004/0148588 A1 | 7/2004 | Sadiq | |
| 2004/0181534 A1 | 9/2004 | Mortensen et al. | |
| 2004/0194016 A1 | 9/2004 | Liggitt | |
| 2004/0205117 A1 | 10/2004 | Hertling et al. | |
| 2004/0205765 A1 | 10/2004 | Beringer et al. | |
| 2004/0230639 A1 | 11/2004 | Soluk et al. | |
| 2005/0044197 A1 | 2/2005 | Lai | |
| 2005/0091639 A1 | 4/2005 | Patel | |
| 2005/0183074 A1 | 8/2005 | Alexander, III et al. | |
| 2005/0193061 A1 | 9/2005 | Schmidt et al. | |
| 2005/0223361 A1 | 10/2005 | Belbute | |
| 2005/0251788 A1 | 11/2005 | Henke et al. | |
| 2005/0273772 A1 | 12/2005 | Matsakis et al. | |
| 2006/0010163 A1 | 1/2006 | Herzog et al. | |
| 2006/0015847 A1 | 1/2006 | Carroll, Jr. | |
| 2006/0031750 A1 | 2/2006 | Waldorf et al. | |
| 2006/0036463 A1 | 2/2006 | Patrick et al. | |
| 2006/0075387 A1 | 4/2006 | Martin et al. | |
| 2006/0080117 A1 | 4/2006 | Carr et al. | |
| 2006/0101038 A1 | 5/2006 | Gabriel et al. | |
| 2006/0106626 A1 | 5/2006 | Jeng et al. | |
| 2006/0130047 A1 | 6/2006 | Burugapalli | |
| 2006/0136832 A1 | 6/2006 | Keller et al. | |
| 2006/0143229 A1 | 6/2006 | Bou-Ghannam et al. | |
| 2006/0150156 A1 | 7/2006 | Cyr et al. | |
| 2006/0165105 A1 | 7/2006 | Shenfield et al. | |
| 2006/0168132 A1 | 7/2006 | Bunter et al. | |
| 2006/0168355 A1 | 7/2006 | Shenfield et al. | |
| 2006/0168557 A1* | 7/2006 | Agrawal et al. | 717/104 |
| 2006/0184866 A1 | 8/2006 | Rees | |
| 2006/0206858 A1 | 9/2006 | Becker et al. | |
| 2006/0235733 A1 | 10/2006 | Marks | |
| 2006/0235986 A1 | 10/2006 | Kim | |
| 2006/0242636 A1 | 10/2006 | Chilimbi et al. | |
| 2006/0253490 A1 | 11/2006 | Krishna et al. | |
| 2006/0265702 A1* | 11/2006 | Isaacson et al. | 717/168 |
| 2006/0271537 A1 | 11/2006 | Chandrasekharan et al. | |
| 2006/0277542 A1* | 12/2006 | Wipfel | 717/174 |
| 2006/0282767 A1 | 12/2006 | Suryanarayana et al. | |
| 2006/0294474 A1 | 12/2006 | Taylor et al. | |
| 2006/0294506 A1 | 12/2006 | Dengler et al. | |
| 2007/0016429 A1 | 1/2007 | Bournas et al. | |
| 2007/0055936 A1 | 3/2007 | Dhanjal et al. | |
| 2007/0106975 A1 | 5/2007 | Deline | |
| 2007/0113191 A1 | 5/2007 | Keller et al. | |
| 2007/0130205 A1 | 6/2007 | Dengler et al. | |
| 2007/0157078 A1 | 7/2007 | Anderson | |
| 2007/0169199 A1 | 7/2007 | Quinnell et al. | |
| 2007/0174763 A1 | 7/2007 | Chang et al. | |
| 2007/0174822 A1 | 7/2007 | Moser et al. | |
| 2007/0203956 A1 | 8/2007 | Anderson et al. | |
| 2007/0220429 A1 | 9/2007 | Kureshy et al. | |
| 2007/0240096 A1 | 10/2007 | Pontoppidan et al. | |
| 2007/0245340 A1 | 10/2007 | Cohen et al. | |
| 2007/0271552 A1* | 11/2007 | Pulley | 717/120 |
| 2007/0277095 A1 | 11/2007 | Ukigawa | |
| 2007/0282885 A1 | 12/2007 | Baude et al. | |
| 2007/0294586 A1 | 12/2007 | Parvathy et al. | |
| 2007/0294664 A1* | 12/2007 | Joshi | 717/109 |
| 2008/0004887 A1 | 1/2008 | Brunswig et al. | |
| 2008/0028302 A1 | 1/2008 | Meschkat | |
| 2008/0065675 A1 | 3/2008 | Bozich et al. | |
| 2008/0077848 A1 | 3/2008 | Roberts | |
| 2008/0083012 A1 | 4/2008 | Yu et al. | |
| 2008/0104617 A1 | 5/2008 | Apacible et al. | |
| 2008/0120557 A1 | 5/2008 | Offenhartz et al. | |
| 2008/0126396 A1 | 5/2008 | Gagnon | |
| 2008/0127087 A1* | 5/2008 | Brookins et al. | 717/121 |
| 2008/0127124 A1 | 5/2008 | Gilfix et al. | |
| 2008/0162304 A1 | 7/2008 | Ourega | |
| 2008/0163164 A1 | 7/2008 | Chowdhary et al. | |
| 2008/0183479 A1 | 7/2008 | Iwashita et al. | |
| 2008/0183744 A1 | 7/2008 | Adendorff et al. | |
| 2008/0184201 A1 | 7/2008 | Burns et al. | |
| 2008/0189358 A1 | 8/2008 | Charles | |
| 2008/0189617 A1 | 8/2008 | Covell et al. | |
| 2008/0196024 A1* | 8/2008 | Barfield et al. | 717/177 |
| 2008/0243901 A1 | 10/2008 | Super et al. | |
| 2008/0250313 A1 | 10/2008 | Kamdar et al. | |
| 2008/0275844 A1 | 11/2008 | Buzsaki et al. | |
| 2008/0276218 A1 | 11/2008 | Taylor et al. | |
| 2008/0276260 A1 | 11/2008 | Garlick et al. | |
| 2008/0295109 A1 | 11/2008 | Huang et al. | |
| 2008/0313648 A1 | 12/2008 | Wang et al. | |
| 2009/0031280 A1 | 1/2009 | Koehler | |
| 2009/0083297 A1 | 3/2009 | Pohl et al. | |
| 2009/0106494 A1 | 4/2009 | Knebel | |
| 2009/0144716 A1 | 6/2009 | Felts | |
| 2009/0144729 A1 | 6/2009 | Guizar | |

(56) References Cited

U.S. PATENT DOCUMENTS

| | | | |
|---|---|---|---|
| 2009/0150565 | A1 | 6/2009 | Grossner et al. |
| 2009/0157859 | A1 | 6/2009 | Morris |
| 2009/0158237 | A1 | 6/2009 | Zhang et al. |
| 2009/0178020 | A1* | 7/2009 | Goodwin et al. ............. 717/104 |
| 2009/0204567 | A1 | 8/2009 | Barrow |
| 2009/0204629 | A1 | 8/2009 | Barrow |
| 2009/0204884 | A1 | 8/2009 | Barrow et al. |
| 2009/0204943 | A1 | 8/2009 | Konduri |
| 2009/0205013 | A1 | 8/2009 | Lowes |
| 2009/0217153 | A1 | 8/2009 | Oshima et al. |
| 2009/0259993 | A1 | 10/2009 | Konduri et al. |
| 2009/0292797 | A1 | 11/2009 | Cromp et al. |
| 2009/0313256 | A1 | 12/2009 | Konduri et al. |
| 2010/0057482 | A1 | 3/2010 | Radhakrishnan et al. |
| 2010/0057836 | A1 | 3/2010 | Anbuselvan |
| 2010/0070553 | A1 | 3/2010 | Addala et al. |
| 2010/0070973 | A1 | 3/2010 | Addala et al. |
| 2010/0082556 | A1 | 4/2010 | Srinivasan et al. |
| 2010/0132009 | A1 | 5/2010 | Khemani et al. |
| 2010/0146291 | A1 | 6/2010 | Anbuselvan |
| 2010/0236660 | A1 | 9/2010 | Ozanne et al. |
| 2010/0313038 | A1 | 12/2010 | Bradley |
| 2011/0023071 | A1 | 1/2011 | Li et al. |
| 2011/0119649 | A1 | 5/2011 | Kand et al. |
| 2013/0086568 | A1 | 4/2013 | Krishnamurthy |

OTHER PUBLICATIONS

Final Office Action for U.S. Appl. No. 12/029,615 mailed on Jul. 31, 2012, 33 pages.
Notice of Allowance for U.S. Appl. No. 12/330,008 mailed on Aug. 7, 2012, 17 pages.
"File and Registry Virtualization—the good, the bad, and the ugly," Jerry's Incoherent Babbling; Windows Connected Blog; Published Dec. 19, 2005; at URL: http://windowsconnected.com/blogs/jerry/archive/2005/12/19/file-and-registry-virtualization-the-good-the-bad-and-t . . . ; 6 pages.
Phanouriou, "UIML: A Device-Independent User Interface Markup Language," Doctoral Dissertation, Virginia Polytechnic Institute and State University, Sep. 26, 2000, 172 pages.
Smith, Portals: Toward an Application Framework for Interoperability,: Communications of the ACM, Oct. 2004, vol. 47, No. 10, pp. 93-97.
Zhang, et al., "Schema Based XML Security: RBAC Approach," Machine Simulator, Third International Conference on Computer Assisted Learning, Published 2003, at URL: http://citeseerx.ist.psu.edu/viewdoc/summary?doi=10.1.1.3.6016, pp. 1-15.
Final Office Action for U.S. Appl. No. 12/203,816, mailed on Jan. 20, 2011, 26 pages.
Non-Final Office Action for U.S. Appl. No. 12/029,724, mailed on Dec. 14, 2010, 43 pages.
Final Office Action for U.S. Appl. No. 12/029,724, mailed on May 5, 2011, 27 pages.
Non-Final Office Action for U.S. Appl. No. 12/029,600, mailed on Apr. 27, 2011, 216 pages.
Hildebrandt, G., "Web-based Document Management", Apr. 2001, 22 pages.
Shang-Pin Ma, "Discovery-Based Service Composition," National Central University, Doctoral Dissertation. Jan. 2007, 109 pages.
Yang et al., "Web Component: A Substrate for Web Service Reuse and Composition". Proc. 14th Conf. Advanced Information Systems Eng. (CAiSE 02), LNCS 2348, Springer-Verlag, 2002, 16 pages.
"AJAX & Security: Vulnerability in DWR Security Logic Identified Can Potentially be exploited to launce DoS attacks and break into back-end servers", published Jan. 8, 2007, AjaxWorld™ Magazine, pp. 1-4 downloaded on Oct. 6, 2008 from http://ajax.sys-con.com/node/319868, 4 pages.
"Direct Web Remoting, About DWR's Javascript Security", 4 pages downloaded from http://directwebremoting.org/dwr/security/script-tag-protection on Oct. 6, 2008.

"Direct Web Remoting, DWR version 2—New and Noteworthy", 4 pages downloaded from http://directwebremoting.org/dwr/changelog/dwr20 on Dec. 5, 2008.
"Direct Web Remoting, DWR: Easy AJAX for JAVA", 2 pages downloaded from http://directwebremoting.org/dwr/overview/dwr on Oct. 6, 2008.
"Direct Web Remoting, Safari, GET and Request Forgery", 1 page downloaded from http://directwebremoting.org/dwr/security/allowGetForSafariButMakeForgeryEasier on Oct. 6, 2008.
"Direct Web Remoting, Security", 4 pages downloaded from http://directwebremoting.org/dwr/security on Oct. 6, 2008.
"Google Web Toolkit, Product Overview", 3 pages downloaded from http://code.google.com/webtoolkit/overview.html on Oct. 6, 2008.
"Oracle Application Framework", Oracle, Dec. 2006, pp. 1-242, 242 pages.
Altenhofen et al., "ASMs in Service Oriented Architectures", Journal of Universal Computer Science, vol. 14, No. 12, 2008, 25 pages.
Box et al., "Web Services Addressing (WS-Addressing)" Aug. 10, 2004, 23 pages, http://www.w3.org/Submission/ws-addressing/#_Toc77464317, printed on Aug. 18, 2009, 23 pages.
Carey, "Making BPEL Processes Dynamic" Oracle Technology Network, 8 pages, printed on Aug. 18, 2009, 8 pages.
Claypool et al., "Optimizing Performance of Schema Evolution Sequences", Objects and Databases [online], 2000 [retrieved Feb. 7, 2012], retrieved from Internet: http://se-pubs.dbs.uni-leipzig.de/files/Claypool2000OptimizingPerformanceofSchemaEvolution Sequences.pdf, pp. 114-127, 14 pages.
Curphey et al., "Web Application Security Assessment Tools", IEEE, 2006, pp. 32-41, 10 pages.
Dipaola et al., "Subverting Ajax", Dec. 2006, 23rd CCC Conference, pp. 1-8, 8 pages.
Hohpe et al., "Messaging Systems" Enterprise Integration Patterns 2004, pp. 57-97, Chapter 3, Pearson Education, Inc, Boston, Massachusetts, 45 pages.
Nagappan et al., "XML Processing and Data Binding with Java APIs" in: Developing Java Web Services: Architecting and Developing Secure Web Services Using Java [online], 2003 [retrieved Feb. 7, 2012], retrieved from Internet: http://java.sun.com/developer/Books/j2ee/devjws/, pp. 313-399, 89 pages.
Steinberg, "Data Binding with JAXB" [online], 2003 [retrieved Feb. 7, 2012], retrieved from Internet: https://www6.software.ibm.com/developerworks/education/x-jabx/x-jaxb-a4.pdf, pp. 1-34, 34 pages.
U.S. Appl. No. 12/791,445, filed May 28, 2010, Kand et al.
Beisiegel, et al., "SCA Service Component Architecture—Assembly Model Specification," Mar. 15, 2007, SCA version 1.00, 91 pages, BEA Systems, Inc.
"Business Process Language (BPEL) and Oracle BPEL Process Manager," Oracle FAQ, updated Jun. 26, 2004, printed on Nov. 11, 2009, at URL: http://www.oracle.com/technology/products/ias/bpel/htdocs/orabpel_faq.html?template=. . . , 3 pages.
Chapman, et al., "SCA Service Component Architecture—Client and Implementation Model Specification for WS-BPEL," Mar. 21, 2007, SCA version 1.00, 15 pages, BEA Systems, Inc.
Chappell, "Introducing SCA," David Chappell & Associates, Jul. 2007, pp. 1-22.
CipherSoft Inc, "Exodus-Main Features Benefits" Products, at URL: http://www.ciphersoftinc.com/products/expdus-features-benefits.html; printed on Aug. 28, 2009; 3 pages.
CipherSoft Inc, "Exodus™ Products," printed on Aug. 28, 2009, at URL: http://www.ciphersoftinc.com/products/migration-products-overview.html; 3 pages.
"Client-Server Modernization—From Oracle® Forms to Java," VGO Software Products, printed on Aug. 28, 2009, at URL: http://www.vgosoftware.com/products/evo/index.php; 2 pages.
Dynamic Structure in ADF UIX Pages, from Oracle ADF UIX Developers Guide, pp. 1-11 downloaded from http://www.oracle.com/webapps/online-help/jdeveloper/10.1.2/state/content/navId.4/navSetId._/vtAnchor.DeltaTree/vtTopicFile.uixhelp%7Cuixdevguide%7Cdynamic%7Cehtml/ on Apr. 21, 2008.
"Oracle Forms to Java Modernization" printed on Aug. 28, 2009, at URL: http://www.vgosoftware.com/products/evo/walkthrough.php; VGO Software Information printed 5 pages.

(56) References Cited

OTHER PUBLICATIONS

Shepherd, et al., "Oracle SCA—The Power of the Composite," An Oracle White Paper, Aug. 2009, pp. 1-19, Oracle.
"Vgo Software First to Convert Oracle Forms to Oracle ADF V11"; VGO News, printed on Aug. 28, 2009; at URL: http://www.vgosoftware.com/about/news/view_article.php?new_id=35; 2 pages.
Non-Final Office Action for U.S. Appl. No. 12/029,605, mailed on May 12, 2010, 13 pages.
Final Office Action for U.S. Appl. No. 12/029,605, mailed on Sep. 28, 2010, 15 pages.
Non-Final Office Action for U.S. Appl. No. 12/029,609, mailed on May 26, 2010, 17 pages.
Final Office Action for U.S. Appl. No. 12/029,609, mailed on Oct. 13, 2010, 14 pages.
Non-Final Office Action for U.S. Appl. No. 12/203,816, mailed on Sep. 2, 2010, 18 pages.
Non-Final Office Action for U.S. Appl. No. 12/138,997, mailed on Jun. 24, 2011, 19 pages.
Cetin, et al., "A Mashup-Based Strategy for Migration to Service-Oriented Computing", IEEE International Conference on Pervasive Services, IEEE, Jul. 20, 2007, pp. 169-172.
Claessens, J., et al., "A Tangled World Web of Security Issues." *First Monday* vol. 7, No. 3-4, (Mar. 2002): 24 pages. Web. Jun. 25, 2013.
Li, M. et al., "Leveraging legacy codes to distributed problem-solving environments: A Web Services Approach", Software: Practice and Experience, vol. 34(13), (2004) pp. 1297-1309.
Li, M. et al., "Sgrid: A Service-Oriented Model for the Semantic Grid", Future Generation Computer Systems, 2004, vol. 20(1), pp. 7-18.
Phillips, Josh. Window's Connected UseriD: Jerry. Jerry's Incoherent Babbling: "File and Registry Virtualization—the good, the bad, and the ugly". <http://windowsconnected.com/blogs/jerry/archive/2005/12/19/file-and-registry-virtualization-the-good-the-bad-and-the-ugly.aspx>. Published: Dec. 19, 2005, 6 pages.
Sneed, Harry M. "Integrating Legacy Software Into a Service Oriented Architecture", Software Maintenance and Reengineering, CSMR 2006, IEEE, 11 pages.
Non-Final Office Action for U.S. Appl. No. 12/203,816 mailed on Oct. 26, 2012 30 pages.
Final Office Action for U.S. Appl. No. 12/203,816 mailed on Jul. 5, 2013, 25 pages.
Advisory Action for U.S. Appl. No. 12/203,816 mailed on Aug. 15, 2013, 3 pages.
Non-Final Office Action for U.S. Appl. No. 12/029,724 mailed on Jan. 7, 2013, 39 pages.
Final Office Action for U.S. Appl. No. 12/029,724 mailed on Apr. 30, 2013, 33 pages.
Terminal Disclaimer—Approved for U.S. Appl. No. 12/029,600 mailed on Oct. 25, 2011, 1 page.
Non-Final Office Action for U.S. Appl. No. 12/029,600 mailed on Sep. 17, 2012, 38 pages.
Notice of Allowance for U.S. Appl. No. 12/029,600 mailed on Nov. 7, 2012, 16 pages.
Notice of Allowance for U.S. Appl. No. 12/029,600 mailed on Feb. 5, 2013, 16 pages.
Notice of Allowance for U.S. Appl. No. 12/029,600 mailed on Jun. 11, 2013, 10 pages.
Non-Final Office Action for U.S. Appl. No. 12/029,605 mailed on Apr. 10, 2013, 38 pages.
Final Office Action for U.S. Appl. No. 12/029,605 mailed on Sep. 6, 2013, 19 pages.
Non-Final Office Action for U.S. Appl. No. 12/029,609 mailed on Jul. 28, 2011, 29 pages.
Notice of Allowance for U.S. Appl. No. 12/029,609 mailed on Feb. 4, 2013, 52 pages.
Notice of Allowance for U.S. Appl. No. 12/029,609 mailed on May 29, 2013, 14 pages.
Non-Final Office Action for U.S. Appl. No. 12/212,599 mailed on Aug. 2, 2012, 18 pages.
Notice of Allowance for U.S. Appl. No. 12/212,599 mailed on Jun. 19, 2013, 6 pages.
Notice of Allowance for U.S. Appl. No. 12/212,599 mailed on Oct. 2, 2013, 3 pages.
Notice of Allowance for U.S. Appl. No. 12/101,420 mailed on Aug. 28, 2013, 9 pages.
Advisory Action for U.S. Appl. No. 12/487,004 mailed on May 24, 2012, 5 pages.
Non-Final Office Action for U.S. Appl. No. 12/487,004 mailed on Sep. 24, 2013, 22 pages.
Advisory Action for U.S. Appl. No. 12/029,615 mailed on Oct. 16, 2012, 5 pages.
Non-Final Office Action for U.S. Appl. No. 12/790,445 mailed on Dec. 19, 2012, 30 pages.
Final Office Action for U.S. Appl. No. 12/790,445 mailed on Jul. 5, 2013, 10 pages.
Notice of Allowance for U.S. Appl. No. 12/138,997 mailed on Nov. 27, 2013, 13 pages.
Chen et. al., Feature Analysis for Service-Oriented Reengineering, IEEE 12th Asia-Pacific Software Engineering Conference (APSEC 2005), Dec. 2005, Taipei, Taiwan.
Advisory Action for U.S. Appl. No. 12/029,605 mailed on Dec. 18, 2013, 4 pages.
Notice of Allowance for U.S. Appl. No. 12/029,605 mailed on Mar. 3, 2014, 15 pages.
Notice of Allowance for U.S. Appl. No. 12/212,599 mailed on Feb. 7, 2014, 5 pages.
Final Office Action for U.S. Appl. No. 12/487,004 mailed on Dec. 27, 2013, 18 pages.
Notice of Allowance for U.S. Appl. No. 12/487,004 mailed on Mar. 6, 2014, 7 pages.
Non-Final Office Action for U.S. Appl. No. 12/790,445 mailed on Dec. 31, 2013, 15 pages.
Notice of Allowance for U.S. Appl. No. 12/101,420 mailed on Mar. 17, 2014, 8 pages.
Non-Final Office Action for U.S. Appl. No. 12/029,615 mailed on Mar. 21, 2014, 29 pages.

* cited by examiner

TECHNIQUES RELATED TO CUSTOMIZATIONS FOR COMPOSITE APPLICATIONS

CROSS-REFERENCES TO RELATED APPLICATIONS

The present application claims the benefit and priority under 35 U.S.C. 119(e) from U.S. Provisional Application No. 61/262,458 filed Nov. 18, 2009 entitled SOA CUSTOMIZATION AND PATCHING, the entire contents of which are herein incorporated by reference for all purposes.

The present application also incorporates by reference for all purposes the entire contents of U.S. Non-Provisional application Ser. No. 12/790,445, filed May 28, 2010, entitled TECHNIQUES FOR DISPLAYING CUSTOMIZATIONS FOR COMPOSITE APPLICATIONS.

BACKGROUND

Embodiments of the present invention relate to software applications and more specifically to a framework for enabling and managing customizations made to software applications.

Software applications often need to be customized to meet the specific needs of the end user. This is particularly true in the field of enterprise software, where each organization may have a unique set of business requirements and data integration needs. For example, a central IT department of an enterprise organization may develop an application for implementing an employee hiring process. The central IT department may then deploy the application to other departments within the organization. The departments receiving the application may however have to customize the application to suit their individual needs. For example, the process used by a Legal Department for hiring an attorney may be different from the process used by an Engineering Department for hiring an engineer. Accordingly, the Legal and the Engineering departments may each customize the application received from central IT according to their needs. The customizations made by the Legal Department may be further customized by individual legal offices. For example, a legal office in California may make customizations to meet California state requirements while a legal office in New York may make customizations to meet the state laws of New York. Accordingly, an application developed by the central IT department may be customized by one or more downstream customizers.

Application customizations are not limited to within an enterprise as described above. For example, a software vendor may develop an application for performing loan processing that may then be deployed to multiple customers such as various mortgage brokers at various different sites. Each broker may customize the application to fit the broker's needs. Further downstream customizations may be performed by downstream customizers.

Accordingly, a base application may be customized in different ways by one or more users (customizers) that are downstream from the originator or creator of the application (the application developer). These customizations however become difficult to manage.

Further, consider the situation when a new version of the base application is released by the application developer. Conventionally, upon receiving a new version of the base application, the downstream customizer has to expend a considerable amount of time and effort in re-implementing the customizations and retesting the customizations against the new version of the application. This process has to be repeated for each new release and becomes time consuming and expensive. In some instances, the application developer may implement predefined customizations directly in the base application. However, this greatly increases the complexity of the base application, resulting in higher development and maintenance costs. In addition, this approach restricts the downstream customizations that can be performed and is thus not flexible enough to address the diverse customization requirements of all the end users/customers of the application.

Various different standards are used for developing applications. One such standard is the Service Component Architecture (SCA) standard that provides a framework for assembling disparate enterprise Service Oriented Architecture (SOA) components into higher-level composite applications. SCA thus provides a framework for creating SOA applications. SCA was developed to simplify the development, deployment, and management of enterprise applications. The SCA specification provides rules/guidelines for development and deployment of applications. For example, the SCA specification defines how the various components/pieces of an application are created and assembled together as modular components. The components in SCA can be implemented using different technologies including Business Process Execution Language (BPEL), which provides a language for implementing business processes orchestrating various services, and Business Process Modeling Notation (BPMN), which is a graphical representation for specifying business processes in a workflow. While the SCA provides guidelines for assembling components into applications, it does not address problems associated with managing customizations to applications. Similarly, while BPEL provides a language for implementing business processes, it does not specify anything to manage the changes in the business processes.

BRIEF SUMMARY

Embodiments of the present invention provide a framework for enabling and managing customizations to an application.

In one embodiment, techniques are provided that enable the customizability of an application to be controlled based upon hierarchical relations between elements of the application. An application developer can control customizations that can be performed by downstream customizers. A customizer can further control customizations that can be made to an application by a downstream customizer within the customization parameters set for the application by the application developer and any customizers that are upstream from the particular customizer. In this manner, a controlled and flexible infrastructure is provided for customizing applications.

According to an embodiment of the present invention, techniques are provided for setting customizability parameters for an application. First customizability parameters may be configured for a first element of the application, where the first customizability parameters control whether the first element is customizable or non-customizable. Second customizability parameters may be configured for a second element of the application, where the second customizability parameters control whether the second element is customizable or non-customizable. Hierarchically, the second element may be contained by the first element. In one embodiment, the second element is allowed to be customized only if the second customizability parameters indicate the second element as being customizable irrespective of the customizability of the first element. Customizations to the second element may not be permitted if the first customizability parameters specify that the first element is non-customizable.

In one embodiment, the first element may be a composite (e.g., an SCA composite) and the second element may be a component. For example, the component may be implemented using Business Process Execution Language (BPEL), Business Process Modeling Notation (BPMN), XML Schema Definition (XSD), Web Services Definition Language (WSDL), Extensible Stylesheet Language (XSL), or an XML-expressed model. In another embodiment, the first element may be a component element and the second element may be a group comprising one or more activities in the component element. In yet another embodiment, the first element maybe a first group of one or more activities and the second element may be a second group or one or more activities.

In one embodiment, a set of customizations made to the first element or the second element may be received. The set of customizations maybe stored along with data related to the application in such a way that the set of customizations is determinable from the data related to the application.

In one embodiment, special processing may be performed when a new version of an application is to be merged into an exiting version of the application to which one or more customizations may have been made. One or more conflicts may be determined based upon a customization made to the application and a new version of the application. The conflict may be then resolved, either automatically, with user intervention, or a combination thereof. Validation, including syntactic and semantic validation, may also be performed based upon the customization made to the application and the new version of the application.

The foregoing, together with other features and embodiments will become more apparent when referring to the following specification, claims, and accompanying drawings.

BRIEF DESCRIPTION OF THE DRAWINGS

In order to more fully understand the present invention, reference is made to the accompanying drawings with the understanding that these drawings are not intended to limit the scope of the claimed invention.

DETAILED DESCRIPTION

In the following description, for the purposes of explanation, specific details are set forth in order to provide a thorough understanding of the embodiments of the invention. However, it will be apparent that the invention may be practiced without these specific details.

Embodiments of the present invention provide a framework for enabling and managing customizations to an application such as a composite application built using SCA. In one embodiment, techniques are provided that enable the customizability of an application to be controlled based upon hierarchical relations between elements of the application.

For example, an application developer can control customizations that can be performed by downstream customizers. A particular customizer can further restrict the customizations that can be made by another downstream customizer. A particular customizer can only impose customization restrictions that are within the customization parameters set for the application by the application developer and any customizers that are upstream from the particular customizer. In this manner, a flexible infrastructure is provided for managing customizations to an application.

Figure 1:
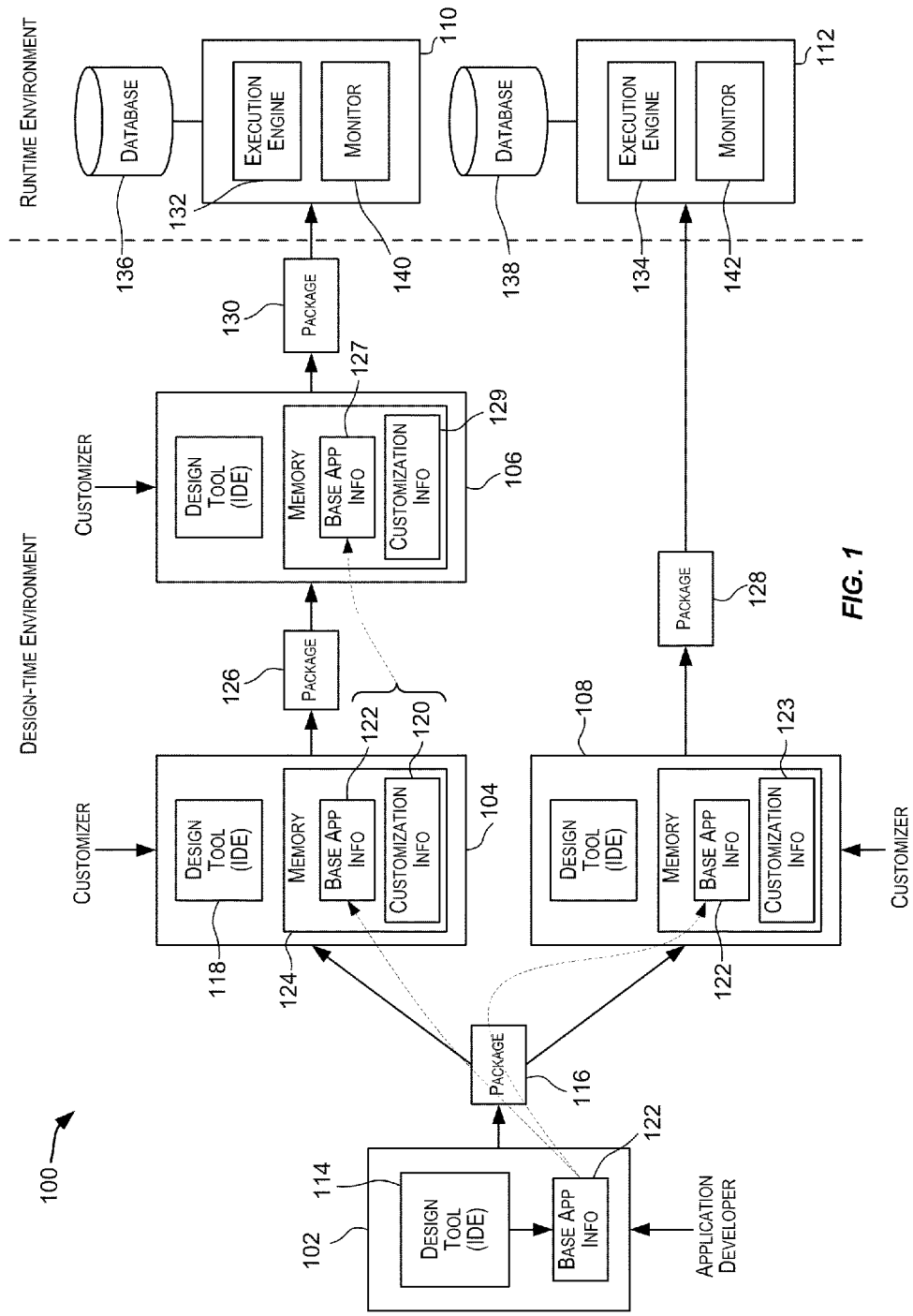
FIG. 1 is a simplified block diagram of a system that may incorporate an embodiment of the present invention.

FIG. 1 is a simplified block diagram of a system 100 that may incorporate an embodiment of the present invention. The embodiment depicted in FIG. 1 is merely an example and is not intended to unduly limit the scope of embodiments of the present invention as recited in the claims. One of ordinary skill in the art would recognize many variations, alternatives, and modifications.

At a conceptual level, system 100 depicted in FIG. 1 may be considered to comprise a design-time segment/environment and a runtime segment/environment. The design-time environment comprises one or more systems that are used to create or author an application (base application) and systems that may be used by customizers to customize the base application. In the embodiment depicted in FIG. 1, the design-time segment comprises a system 102 that is used by an application developer to create or author an application and systems 104, 106, and 108 that are downstream from the application developer and are used by customers to make customizations to the application. The runtime segment comprises one or more systems on which customized versions of the application are executed. In the embodiment depicted in FIG. 1, the runtime segment comprises runtime systems 110 and 112. Although separate systems are depicted in FIG. 1 for creating, customizing, and executing an application, in alternative embodiments, a particular system may be used to create an application, make customizations to the application, and/or to execute the application.

For purposes of explaining various features of an embodiment of the present invention, it is assumed that the application that is created by an application developer and which may be customized by one or more customers is a Service Component Architecture (SCA) composite application. The SCA-based implementation is being used merely as an example for describing features of the inventive embodiment and is not intended to limit the scope of the present invention as recited in the claims.

As previously indicated, SCA provides a programming framework for building applications and solutions based on SOA. It is based on the idea that business function is provided as a series of services, which are assembled together to create solutions that serve a particular business need. An application (also referred to as composite application or simply a composite) can contain both new services created specifically for the application and also business functions from existing systems and applications, reused as part of the composition.

An SCA application composite provides a single unit that wraps together various components and related metadata. An SCA composite thus provides a single unit of deployment for an application. An SCA composite can also comprise other composites thereby allowing for nesting of composites. A composite may comprise one or more one or more components, where each component provides the logic or implementation to be used within the application. Each component thus provides an atomic portion of the business functionality required to make the composite application useful. Components may be connected to other components using connections referred to as wires. Functionality provided by a composite is exposed via one or more services. A service provided by a composite is callable by a user of the composite. A composite may also comprise one or more references that represent external dependencies of the composite. A wire may connect services, components, and/or references.

A composite may have one or more associated properties. A property may be a settable data value or attribute that influences the operation of the function provided by the composite. A property associated with a composite allows for customization of the composite's behavior. For example, a composite might rely on a property to tell it aspects of the runtime environment, thereby enabling the composite to customize its runtime behavior appropriately.

A composite has associated metadata that specifies information related to the composite. For example, the metadata for a composite may comprise information related to services exposed by the composite, the composite's references, members of the composite such as components or other composites, wiring information for the composite (e.g., wiring between components), and properties of the composite. The metadata for a composite may be stored in XML format. For example, for a composite labeled "Composite", the metadata for the composite may be stored in an XML file named "Composite.xml." The metadata for a composite may be stored in one or more files.

A component represents a configured instance of an implementation within a composite, where the implementation is the piece of program code implementing logic that provides a portion of the functionality (e.g., business functions) of the composite. A function provided by a component may be offered for use as a service of the component. A service provided by a component thus represents a functionality or operation provided by the component. A set of services exposed by a component may represent an addressable set of operations of a component implementation that are designed to be exposed for use by other implementations or exposed publicly for use elsewhere. A service may provide a number of operations that can be accessed by the component's clients.

A component may depend on one or more services provided by other components—these dependencies are called references of the component. A component might rely on services provided by other components in its domain or by software outside its domain. A reference represents a dependency that an implementation of a component has on a service that is supplied by some other implementation. A component thus indicates its dependencies on external services using references. A component may call a reference during the execution of its functions. Each reference of a component defines an interface containing operations that the component needs to invoke to provide its services. A component can have one or more references.

SCA enables a composite to comprise components implemented using a wide variety of different implementation technologies. For example, programming technologies such as BPEL, BPMN, XML Schema Definition (XSD), Web Services Definition Language (WSDL), Extensible Stylesheet Language (XSL), an XML-expressed model, and others may be used to implement the components of a composite. For example, a BPEL-implemented component (referred to as a BPEL component) may implement logic for a business process orchestration.

A component can have associated properties. A property may be a settable data value or attribute that influences the operation of the function provided by the component. A component's behavior may be configured by providing values for the component's properties. A component's behavior may thus be customized by configuring the component's properties. For example, a component might rely on a property to tell it aspects of the runtime environment, thereby enabling the component to customize its runtime behavior appropriately.

A component may have associated metadata. The metadata for a component may identify the services and references provided by the component. The metadata may also identify the implementation technology or model used for implementing the component logic. For example, the metadata may also identify transformation and schema information such as information related to XSDs, XSLs, etc. Properties associated with the component may also be identified by the component's metadata. The metadata for a component may be stored in one or more files. For example, a component type file may store an implementation type for the component while separate files may be used to store metadata information related to properties of the component.

As indicated above, different technologies may be used to implement a component. For example, a BPEL component may be implemented using BPEL. Likewise, a BPMN component may be implemented using BPMN and so on. A BPEL component may provide orchestration for a business process.

A BPEL component may orchestrate a workflow comprising a series of activities. One or more activities in a BPEL component may be grouped together to form a group (or scope) of activities. Other technologies that may be used to implement a component include XML Schema Definition (XSD), Web Services Definition Language (WSDL), Extensible Stylesheet Language (XSL), a metadata model expressed in XML, and others.

The metadata file for a component may be labeled as "component_name.ext" where "component_name" is a name that may be used to reference the component and "ext" may depend upon the technology used to implement the component (model). For example, the metadata file for a component implemented using BPEL may be named "*.bpel".

Accordingly, an SCA composite may comprise one or more composites and/or one or more components. Each component may comprise one or more activities. One or more activities in a component may be grouped to form a group of activities as per the component specific metamodel. An SCA composite thus comprises a number of elements with hierarchical relationships between the elements. An element may be another composite, a component, an activity, a group (e.g., a group of activities, a group comprising another group, etc.), services, references, wiring, etc. The metadata stored for a composite identifies the elements of the composite. The metadata may also identify hierarchical relationships between one or more elements. In one embodiment, the metadata is stored in XML format and identifies the parent-child relationships between the XML elements.

Accordingly, an application may be based upon various elements with hierarchical relationships between the elements. An element that can comprise or contain one or more other elements is referred to as a container element. The elements that are contained in a container element may be referred to as members or children of the container element. A container element comprising one or more children elements may be referred to as the parent (or parent element) of the children. A container element can have zero or more children or members. Examples of container elements include a composite, a component, and a group.

A composite application can comprise multiple levels of hierarchies. For example, a composite may comprise one or more other composites and/or one or more components. A component can comprise one or more activities that are organized into groups. A group can comprise one or more activities or other groups, and so on. According to an embodiment of the present invention, the customization of a composite application can be configured and managed at each hierarchical level and the hierarchical relationships between elements of a composite affect the customizability or non-customizability of portions of the application.

Figure 2:
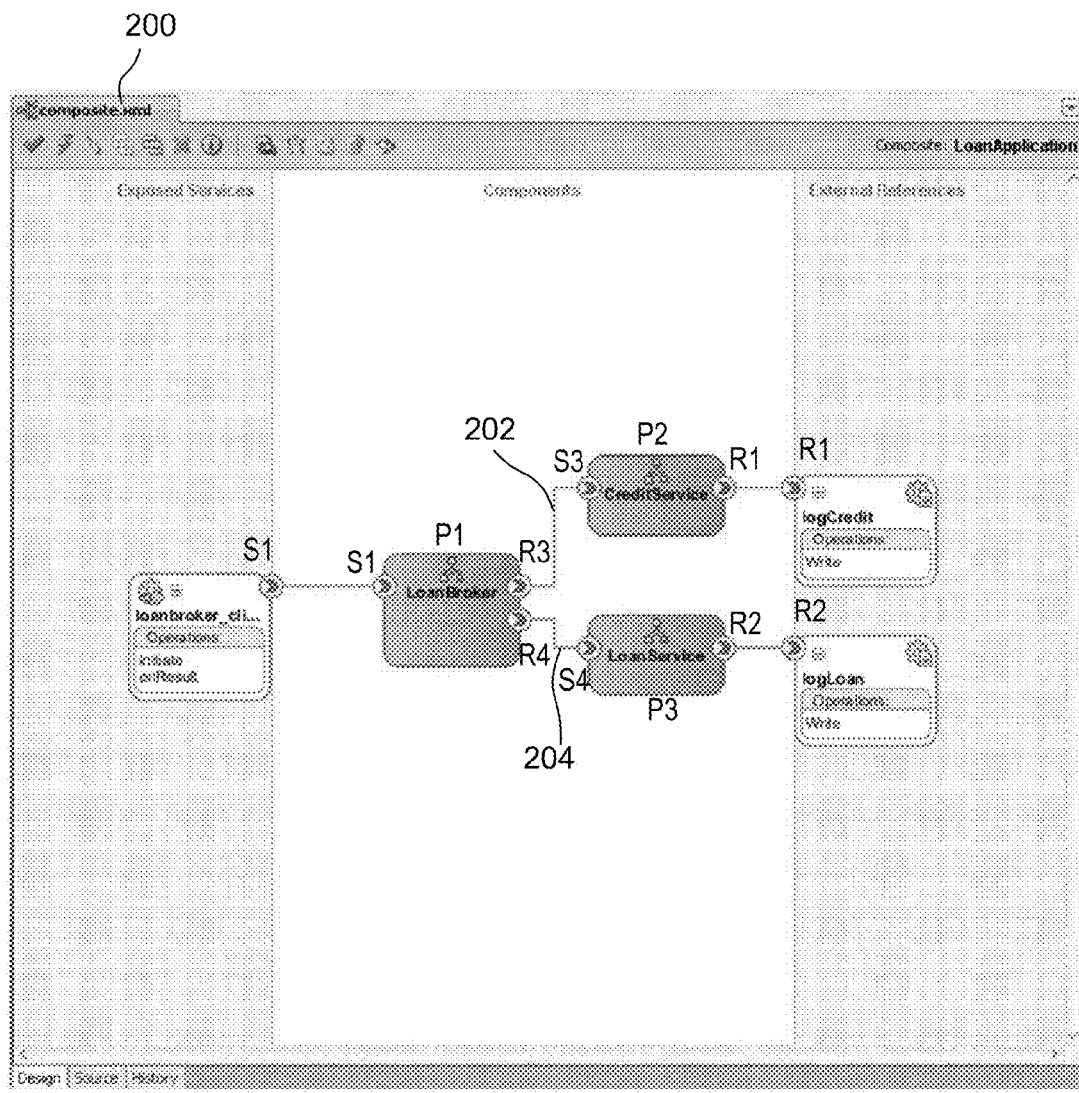
FIG. 2 depicts a graphical representation of an example composite application that may be created by an application developer according to an embodiment of the present invention.

FIG. 2 depicts a graphical representation of an example composite application 200 that may be created by an application developer according to an embodiment of the present invention. In the embodiment depicted in FIG. 2, composite 200 exposes a service S1 and is dependent upon external references R1 and R2. Composite 200 is a container element that comprises components "LoanBroker", "CreditService", and "LoanService" as its members. One or more of the components depicted in FIG. 2 may be a BPEL component, i.e., a component implemented using BPEL. A service provided by a composite is typically provided by a component within the composite. For example, in FIG. 2, composite 200 exposes service S1 by promoting service S1 of component "LoanBroker" and is dependent upon external references R1 and R2, which may be services provided by some other composites.

Each component included in composite 200 may in turn comprise one or more services, references, and properties. For example, component "LoanBroker" exposes service S1, references R3 and R4, and property P1; component "CreditService" comprises service S3, reference R1 and property P2; and component "LoanService" comprises service S4, reference R2 and property P3. The components are wired in a certain configuration with wire 202 connecting R3 of "LoanBroker" to S3 of the "CreditService" component and wire 204 connecting R4 of the "LoanBroker" component to S4 of the "LoanService" component.

Figure 3:
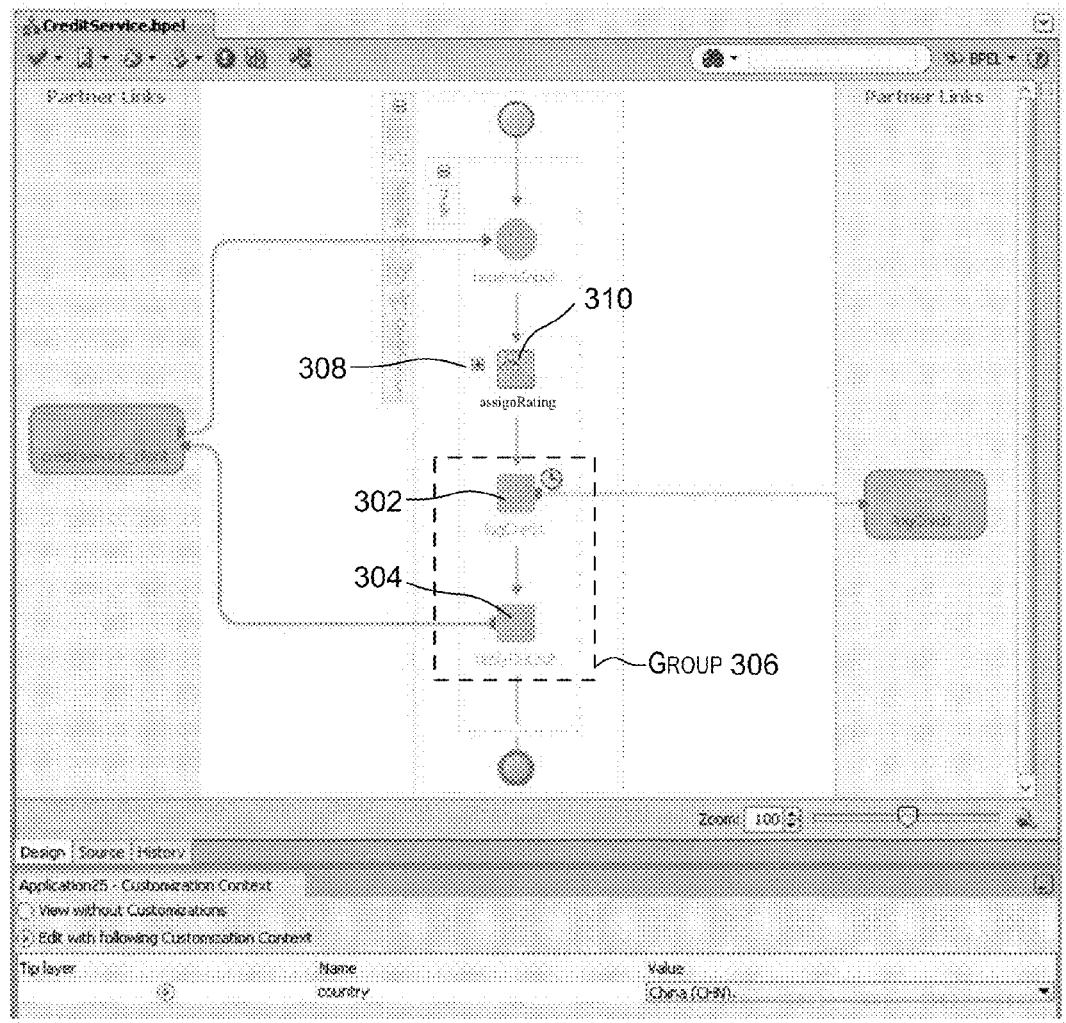
FIG. 3 depicts a graphical representation of a BPEL component according to an embodiment of the present invention.

A component (e.g., a BPEL component or a BPMN component) can be a container element and can comprise other elements such as activities and groups of activities. FIG. 3 depicts a graphical representation of a BPEL component according to an embodiment of the present invention. The component depicted in FIG. 3 corresponds to component "CreditService" depicted in FIG. 2. As depicted in FIG. 3, BPEL component "CreditService" provides an orchestration of business flow comprising several activities (represented by circles and squares). One or more of the activities may be grouped into groups (also referred to as scope). In FIG. 3, activities "logCredit" 302 and "replyOutput" 304 are grouped together to form a group 306. Element "assignRating" 310 depicted in FIG. 3 is also a container element (a group) as indicated by the "+" symbol 308 next to the element. Clicking on this symbol displays the elements that are members of the group.

Figure 4:
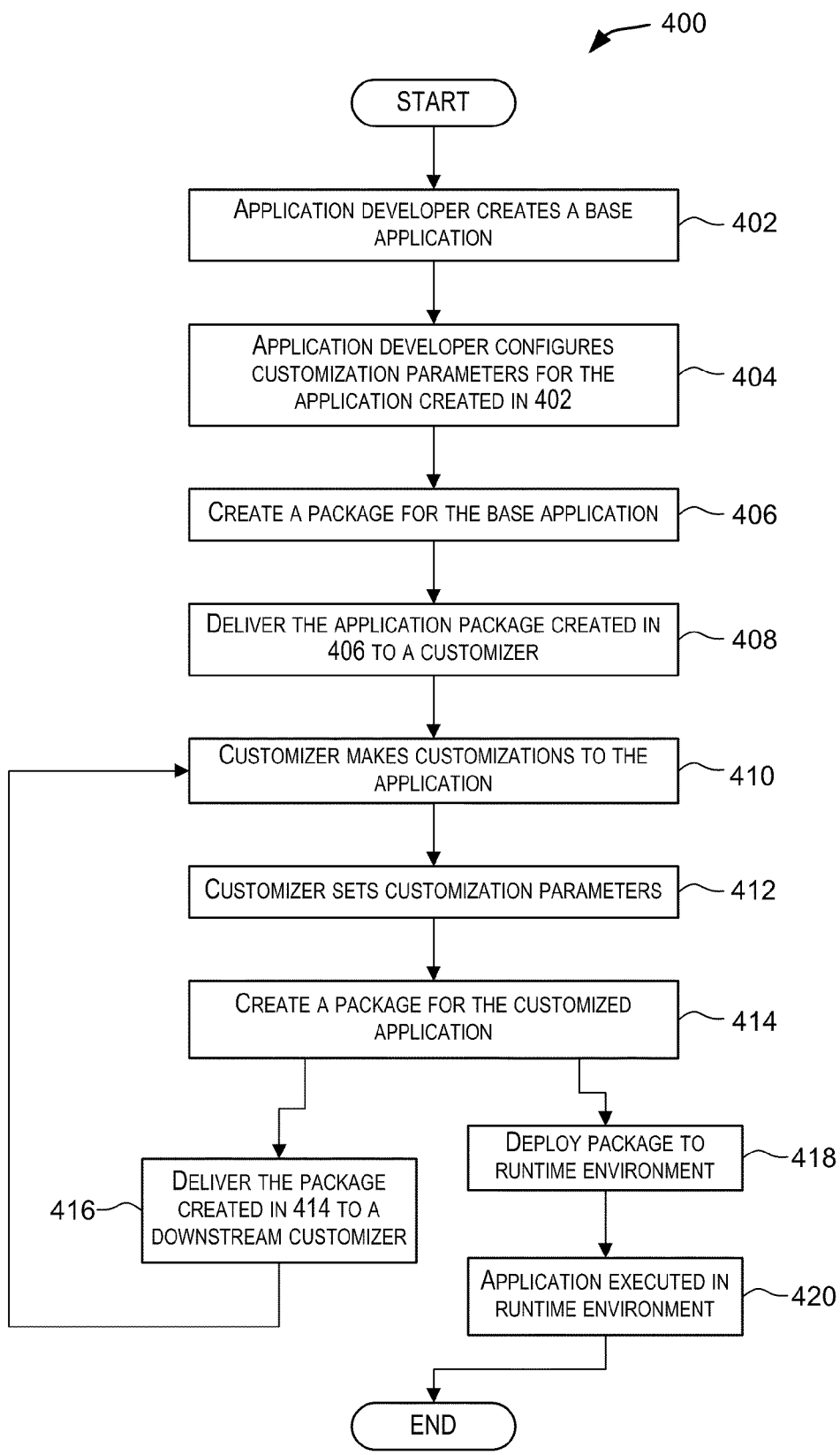
FIG. 4 depicts a simplified flowchart showing high level design-time and runtime-related activities that may be performed according to an embodiment of the present invention.

Referring back to FIG. 1, the processing performed by the various systems depicted in FIG. 1 may be described in conjunction with the flowchart depicted in FIG. 4. FIG. 4 depicts a simplified flowchart 400 showing high level design-time and runtime-related activities that may be performed according to an embodiment of the present invention. The processing related to the activities may be performed by software (e.g., code, instructions, program) executed by a processor, by hardware, or combinations thereof. The software may be stored on a non-transitory computer-readable medium. The activities depicted in FIG. 4 are only examples and are not intended to limit the scope of embodiments of the present invention as recited in the claims.

As depicted in FIG. 4, an application developer may create a base application (step 402). In one embodiment, as depicted in FIG. 1, an application developer may use system 102 to create a base application. The base application may be a composite application comprising one or more elements. System 102 may provide various tools that enable the application developer to create the base application. These tools may include for example, an Integrated Development Environment (IDE) 114 executing on system 102. Examples of IDEs include JDeveloper, Eclipse plug-in for BPEL, and others. Various other tools may also be used.

In one embodiment, IDE 114 may provide a special role (or login/special mode) that enables a user to indicate to the system that the user is an application developer and enables the user to create a new application. For example, a special "Application Developer" role may be provided, and when a user logs into system 102 in this role, the user is allowed to create new applications.

Information related to the base application created by the application developer may be stored as base application information 122 depicted in FIG. 1. For example, for a composite application, base application information 122 may comprise metadata related to the composite such as information identifying elements (e.g., composites, components, etc.) of the composite, hierarchical relationships between the elements, properties of the composite, user interface-related information for the base application, and other information related to the composite. In one embodiment, base application information 122 may comprise one or more metadata files related to various elements of the application such as files for composites, components, etc.

IDE 114 may provide tools that enable an application developer to build a composite application. For example, an IDE such as JDeveloper allows an application developer to drag and drop components (e.g., BPEL, BPMN, Mediator components) into the IDE and wire the components as desired. The components may be selected from preconfigured components or alternatively new components may be created. IDE 114 thus enables an application developer to create and piece together various elements to build a composite application.

The application developer may then configure customization parameters for the base application created in 402 (step 404). As part of 404, the application developer may specify which portions of the base application are to be made user-customizable and those that are not. In one embodiment, the customizability or non-customizability of the application may be specified on a per element basis of the application. For example, the application developer may, on a per element basis, tag the element as being customizable or non-customizable. In one embodiment, in the default, all elements of an application are non-customizable unless tagged as customizable by an application developer. In an alternative embodiment, in the default, all elements of an application are customizable unless tagged as non-customizable by an application developer. The customization parameters associated with the application may be stored as part of base application information 122.

In one embodiment, IDE 114 may provide a special role (or login/special mode) that not only enables a user to create an application but also enables the user to define which portions of the application are customizable. For example, a special "Application Developer" role may be provided, and when a user logs into system 102 in this role, the user is allowed to create applications and also specify customizability options for the application.

In one embodiment, for a composite application, the application developer may specify customizability for the application on a per container element basis. Examples of container elements include a composite, a component, a group, etc. Since the elements in a composite application may be organized hierarchically with one element containing another element, which in turn may contain another element, and so on, specifying customizability options on a per container element basis enables the application developer to control the customizability of the application at different hierarchical levels. Further, the hierarchical relationships between the various elements affect the customizability and/or non-customizability of portions of a composite application.

As a result of processing performed in 404, the base application created in 402 may comprise customizable portions and/or non-customizable portions. For example, certain elements of an application may be configured as being customizable while other elements of the application may be configured as being non-customizable. In one embodiment, unless an element is specifically tagged as being customizable it is considered non-customizable. In certain embodiments, all elements of an application may be tagged as being customizable.

Information related to customizability of an application may be stored as part of base application information 122. For example, base application information 122 may store metadata identifying customization parameters configured for the application by the application developer in 404. As indicated above, in one embodiment, customization may be specified on an element by element basis. In such an embodiment, the metadata may identify the various elements of the application and identify the customizability options for each element. The customization parameters may also be stored on a per element basis. For example, customization parameters for an element may be stored in a metadata file corresponding to the element. For example, customization parameters for a component may be stored in a metadata file for the component.

The customization parameters configured for an element indicate whether or not the element is customizable. If customizable, the customization parameters may further identify (1) the manner in which the element may be customized (sometimes referred to as the scope of the customization), and (2) who can perform the customizations (e.g., certain roles, user ids, etc.).

There are different ways in which an element may be customized. In one embodiment, when an element of an application is tagged as being customizable, it implies that customizations can be made to the element's properties and its member elements. Customizations that can be made to an element's properties include deleting a property of the element, modifying a property of the element (e.g., changing a value assigned to a property), or adding a new property to the element. When an element is tagged as being customizable, customizations that can be made to the element with respect to its members include deleting a member element, adding a new member element, or changing the connections (wiring) between member elements.

Accordingly, an element of an application can be tagged as either being customizable or non-customizable. In one embodiment, the hierarchical relationships between elements of a composite affect the customizability and non-customizability of the elements. In one embodiment, if a particular container element is tagged as being non-customizable, then all elements contained by the particular container element are automatically rendered non-customizable. There may be multiple levels of elements that are contained by the particular container element and all those are tagged as being non-customizable if the particular element is tagged as non-customizable. In this manner, looking at it from the perspective of hierarchies, for a particular container element tagged as being non-customizable, all elements that are descendants of that particular element are also considered to be non-customizable. In this manner, the attribute of non-customizability is automatically inherited by all descendants of a container element marked as being non-customizable. For example, if a component is tagged as being non-customizable, then all activities within that component and any groups of activities within the component are all automatically made non-customizable.

In one embodiment, if an element is not specifically tagged as being customizable, then it is treated as being non-customizable. In this embodiment, an element has to be specifically tagged as being customizable to make it customizable. In such an embodiment, when a particular container element is tagged as being customizable, then any elements that are members (i.e., contained by) of that particular container element are not automatically made customizable—each individual element in that container has to be specifically tagged as being customizable to make it customizable. Accordingly, while in the case of non-customizability the descendants of a container element that has been tagged as being non-customizable automatically inherit the non-customizability, it is not the same for the case of customizability. In the case of customizability, tagging a first container element of a composite as being customizable does not automatically make a second container, which is hierarchically contained by the first container, customizable—the second container element has to be specifically tagged as being customizable to make it customizable. Further details related to effects of elements hierarchy on customizability and non-customizability of elements is described below with respect to FIG. 7.

In one embodiment, the degree of customizability of an element, which indicates the extent of customizations that can be made, may also be configured. Accordingly, for an element tagged as being customizable, the application developer may set or restrict the customizations that can be performed. For example, for an element, the application developer may set customization parameters that allow a customizer to only modify properties of the element but not allow addition of new properties or deletion of existing properties of the element. As another example, customization parameters for an element may be configured such that only the wiring between members of the element can be changed but deletion of members or addition of members is not permitted. In this manner, as part of 404, the application developer may not only identify which portions of the application are customizable (or non-customizable) but also specify the degree of customizability.

In one embodiment, multiple layers of customization may be configured for an application. For example, for a composite application related to a base recruitment process (which may be expressed using BPEL or BPMN components), the process may be modified differently for hiring an employee versus hiring a manager. Accordingly, customizations for an employee hiring process and customizations for a manager hiring process may represent two separate layers of customization for the application. In such a scenario, one layer of customization parameters may be specified for employee hiring and a second layer of customization parameters may be defined for hiring a manager.

IDE 114 may provide various tools that enable an application developer to configure customization parameters for an application. For example, the IDE may provide a GUI that displays various elements of an application and enables the application developer to select and tag individual elements as being customizable or not. The IDE may also provide tools that enable the application developer to set the degree of customizability for each element marked as being customizable. The GUI may also display the hierarchical relationships between the various elements such that a customizer can specify customizability/non-customizability at different hierarchical levels.

Figure 5A:
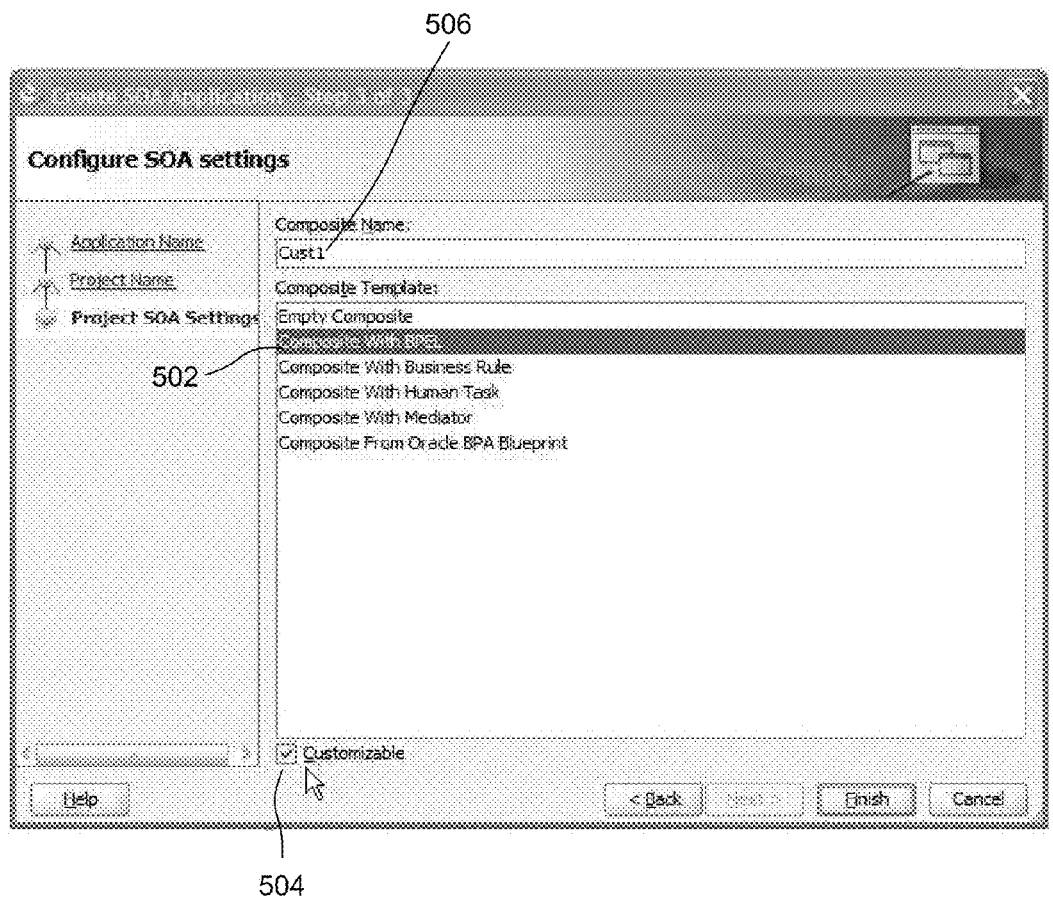
FIGS. 5A and 5B depict examples of user interfaces that may be used to specify customization parameters for an application according to an embodiment of the present invention.
Figure 5B:
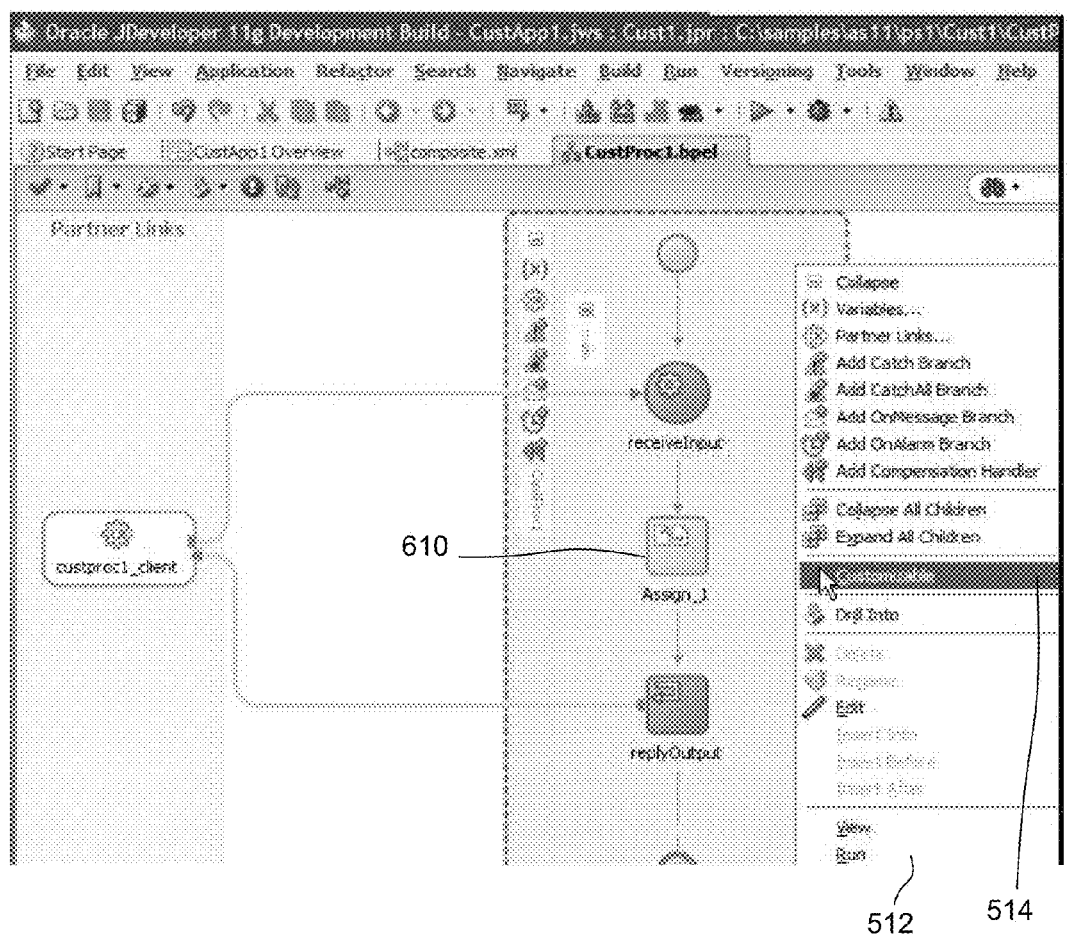

FIGS. 5A and 5B depict examples of user interfaces that may be used to specify customization parameters for an application according to an embodiment of the present invention. The GUI depicted in FIG. 5A enables an application developer to create a composite and specify whether or not the composite is customizable. As depicted in FIG. 5A, the application developer may provide an identifier "Cust1" 506 for the composite, indicate 502 that the composite is to be a composite with BPEL components, and then set a customizable option 504 for the selected element to indicate that the composite is to be made customizable (when 504 is selected) or non-customizable (when 504 is unselected).

FIG. 5B depicts another interface that may be used to tag an element of an application as being customizable according to an embodiment of the present invention. FIG. 5B depicts the internals of a BPEL component "Cusproc1.bpel". This BPEL component comprises a number of activities represented by circles and squares. As depicted in FIG. 5B, an application developer may select an element 510 (in this case an activity) within the component, bring up a menu 512 (e.g., by right clicking on a mouse), and select a "Customizable" option 514 from the menu to configure the selected activity as being customizable.

Figure 6A:
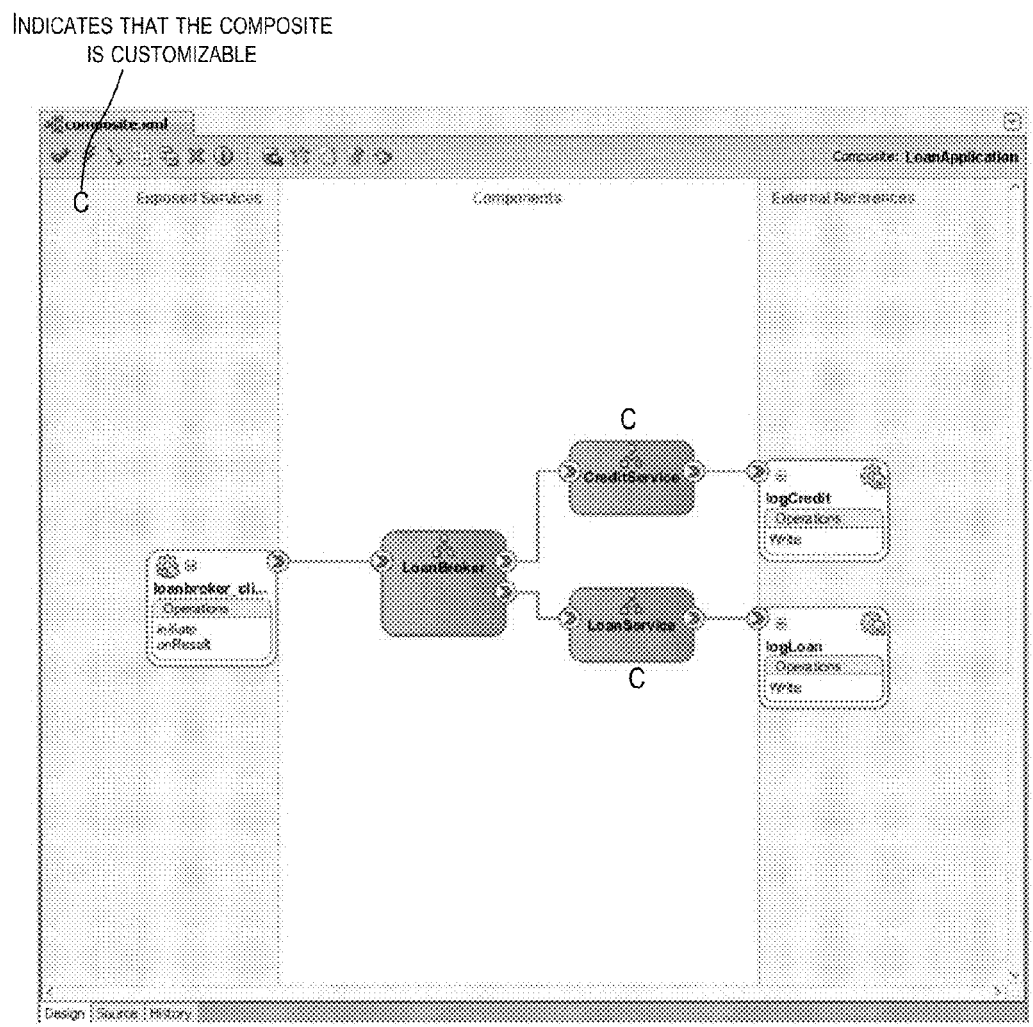
FIGS. 6A and 6B depict different ways for identifying customizable portions of an application according to an embodiment of the present invention, with FIG. 6A depicting an SCA assembly diagram with various components including BPEL components and FIG. 6B depicting a BPEL based orchestration.
Figure 6B:
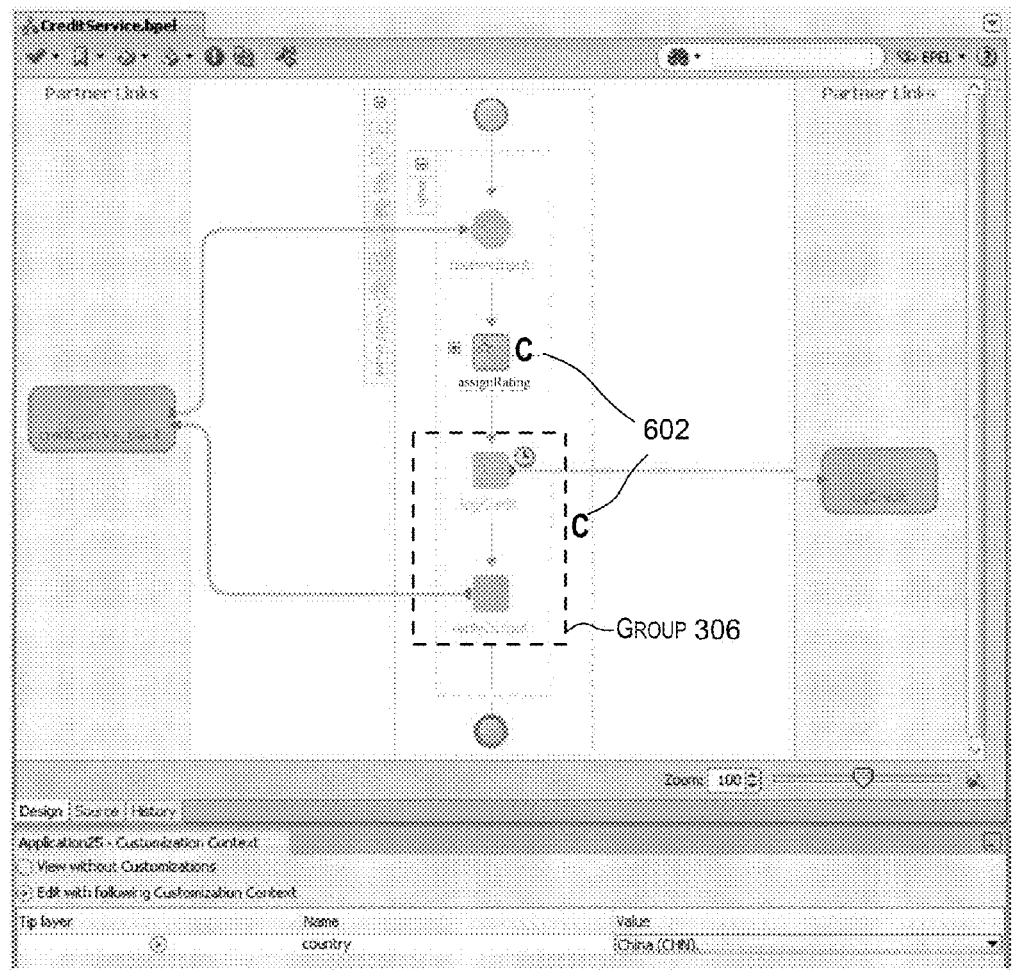

In one embodiment, IDE 114 may also display information for an application in such a way that customization parameters configured for the application are easily discernible. For example, IDE 114 may display information for an application such that elements of an application that are tagged as customizable and those that are not customizable are clearly visually identifiable. Different styles may be used for the visual indications. For example, in one embodiment, icons/letters/markings may be placed next to the customizable elements to distinguish them from the non-customizable elements of the application. For example, in FIG. 6A, which depicts the composite application from FIG. 2 and its component members, a letter "C" is displayed to indicate that an element is configured as being customizable. In the embodiment depicted in FIG. 6A, the composite element, component "LoanService", and component "CreditService" are all customizable (as indicated by the "C"); the other depicted elements are not customizable. As another example, FIG. 6B depicts the elements of BPEL component "CreditService.bpel" depicted in FIG. 3. In FIG. 6B, a "C" is placed proximal to group "assignRating" and group 306 to indicate that both these groups within component CreditService are customizable. In the examples described above, the letter "C" is used to identify elements that are customizable. In other embodiments, the customizability of elements may be displayed using a different color or pattern, a different font, and the like.

Figure 7:
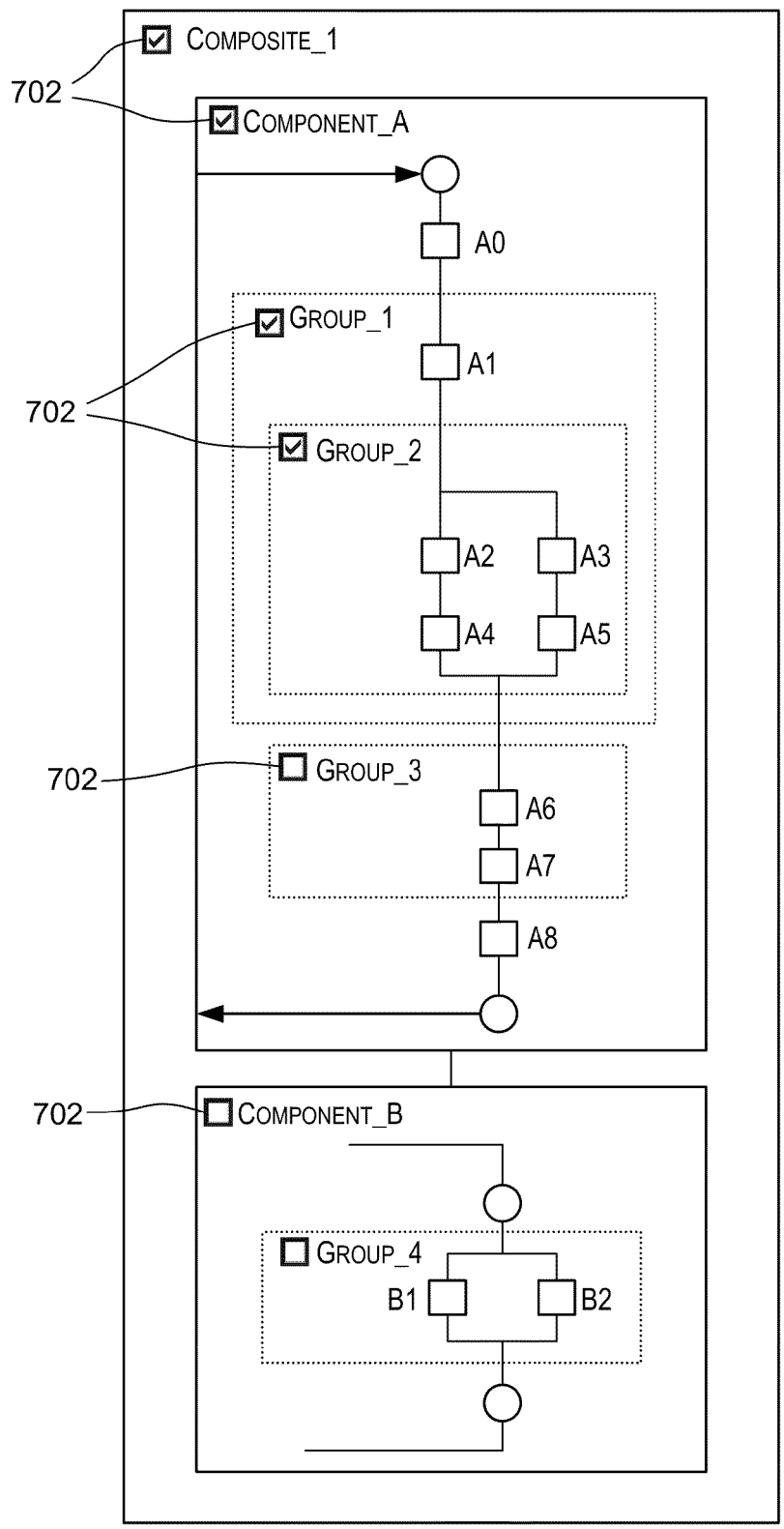
FIG. 7 depicts a user interface that may be used for configuring the customizability of an application according to an embodiment of the present invention.

FIG. 7 depicts a user interface that may be used for configuring the customizability of an application according to an embodiment of the present invention. In the embodiment depicted in FIG. 7, composite application "Composite_1" contains two member elements: Component_A and Component_B. The technology used to implement Component_A may be the same as or different from the technology used to implement Component_B. For example, Component_A may be a BPEL component while Component_B may be a mediator or a BPMN component. Components Component_A and Component_B each comprise several activities represented by squares and circles. Activities A1, A2, A3, A4, and A5 of Component_A are grouped together to form Group_1. Activities A2, A3, A4, and A5 of Component_A are grouped together to form Group_2. Activities A6 and A7 of Component_A are grouped together to form Group_3. Activities B1 and B2 of Component_B are grouped together to form Group_4.

In the embodiment depicted in FIG. 7, a checkbox 702 is displayed for each container element. The checkboxes enable an application developer to tag or mark container elements as customizable or non-customizable. For example, the application developer may tag a container element as being customizable by selecting (represented by a check sign) the checkbox associated with the element. The application developer may unselect a checkbox associated with a container element to indicate that the element is not customizable. The checkboxes also provide a visual indication of which portions (e.g., elements) of an application are customizable. Non-customizability is automatically inherited by all descendants of a container element marked as being non-customizable. In the case of customizability, tagging a container element as being customizable does not automatically make a member container element customizable unless that member container element is specifically tagged as being customizable. For example, it can easily be seen from FIG. 7 that container elements Composite_1, Component_A, Group_1, and Group_2, with selected checkboxes, are customizable, while container elements Group_3, Component_B, and Group_4 with unselected checkboxes, are not customizable.

For the embodiment depicted in FIG. 7, the effect of hierarchical relationships between the various elements of Composite_1 can be explained as follows:

(1) Composite_1: Composite_1 is tagged as being customizable as indicated by the selected checkbox associated with Composite_1. This enables a customizer to add/delete/modify properties of Composite_1. New elements (e.g., new components) may be added to Composite_1. Elements of Composite_1 such as Component_A and/or Component_B can be deleted or the connections (wiring) between Component_A and Component_B can be changed. However, customizability of Composite_1 does not allow customization of Component_A and Component_B (unless those components themselves are marked as being customizable). Since Component_B is tagged as being non-customizable, a customizer cannot make changes to Component_B.

(2) Component_A: Component_A in FIG. 7 is configured to be customizable as indicated by the selected checkbox associated with Component_A. It is to be noted that even though Composite_1 is tagged as being customizable, Component_A has to be specifically tagged as being customizable to make it customizable. This enables a customizer to add/delete/modify properties of Component_A (e.g., add/delete/modify references or services of Component_A). A customizer can add new activities at the level of Component_A, but cannot add an activity within another container (e.g., Group_1, Group_2, or Group_3) inside Component_A unless that container is also tagged as being customizable. For example, a customizer cannot add an activity within Group_3, which is non-customizable. A customizer may modify/delete activities at the level of Component_A but not activities that are within container elements within Component_A that are tagged as being non-customizable. For the embodiment in FIG. 7, a customizer can delete/modify activities A0, A1, A2, A3, A4, A5, and A8 but not activities A6 and A7 that are members of Gorup_3, which is non-customizable. A customizer is permitted to add new groups at the level of Component_A, but cannot add a group within a group inside Component_A unless that group is also customizable. For the embodiment in FIG. 7, the customizer cannot add a group within Group_3, which is non-customizable. A customizer is permitted to delete Group_1, Group_2, or Group_3. However, if Group_1 was non-customizable, then a customizer could not delete Group_2 even though Component_A was customizable. A customizer is permitted to change the connections between the activities at the level of Component_A and activities within those containers within Component_A that are also customizable.

(3) Group_1: Group_1 in FIG. 7 is configured to be customizable as indicated by the selected checkbox associated with Group_1. This enables a customizer to add/delete/modify properties of Group_1. A customizer is permitted to add new activities at the level of Group_1 and also to Group_2 since Group_2 is also tagged as being customizable. A customizer may modify/delete activities at the level of Group_1 (i.e., activity A1) and also activities A2, A3, A4, and A5 of Group_2 since Group_2 is also customizable. However, if Group_2 had been tagged as being non-customizable, then even though Group_1 is customizable, a customizer could not have added activities to Group_2 or modified/deleted activities from Group_2. A customizer is permitted to add new groups at the level of Group_1 and within Group_2 since Group_2 is customizable. A customizer can delete Group_2. A customizer is also permitted to change the connections (i.e., wiring) between the activities at the level of Group_1 and also within Group_2 since it is customizable.

(4) Group_2: Group_2 in FIG. 7 is configured to be customizable as indicated by the selected checkbox associated with Group_2. This enables a customizer to add/delete/modify properties of Group_2. A customizer is permitted to add new activities at the level of Group_2. A customizer may modify/delete activities (A2, A3, A4, and A5) at the level of Group_2. A customizer is permitted to add new groups at the level of Group_2. A customizer is also permitted to change the connections (i.e., wiring) between the activities at the level of Group_2.

(5) Group_3: It is to be noted that even though Component_A is tagged as being customizable, this does not make Group_3 automatically customizable unless specifically tagged as such. Since the checkbox corresponding to Group_3 has not been selected, Group_3 is configured to be non-customizable. As a result, a customizer is not permitted to customize the properties or activities (A6 and A7) of Group_3.

(6) Component_B: Component_B in FIG. 7 is configured to be non-customizable as indicated by the unselected checkbox associated with Component_B. Accordingly, a customizer is not permitted to customize any properties or activities of Component_B. Since non-customizability is automatically inherited by all descendants of Component_B, Group_4 is also automatically non-customizable.

(7) Group_4: Since group_4 is a descendant of Component_B, it automatically inherits the non-customizability from Component_B. In one embodiment, the checkbox for Group_4 may be grayed out since it cannot be set due to Component_B being tagged as being non-customizable. No properties or activities of Group_4 can be added/deleted/modified by a customizer.

Referring back to FIGS. 1 and 4, once an application has been created and customization parameters set for the application, the application may be delivered to one or more customers (e.g., sites/departments/vendors, etc). The application may be delivered in the form of a package. Accordingly, a package may be created for the application (step 406). For example, for an application created using the SCA framework, a composite forms the unit of delivery. As depicted in FIG. 1, a package 116 may be created for a composite application authored using system 102. In one embodiment, the IDE may create a "*.SAR" package. The package may comprise a directory structure with a directory "Project" corresponding to the composite application. The "Project" directory may have a sub-directory corresponding to the composite application. The directory ("Composite") for a composite may have sub-directories corresponding to member elements (e.g., components) of the composite. The directories may store metadata information for the application. For example, for a BPEL process component, a "process.bpel" file may be stored storing metadata for the BPEL component.

The package created in 406 may then be delivered to one or more customizers (step 408). For example, as depicted in FIG. 1, package 116 may be shipped to systems 104 and 108 used by customizers. For example, if system 102 is a central IT department system within an organization, package 116 may be delivered to systems 104 and 108 of different departments within the organization. For example, systems 104 and 108 may represent systems of Legal and Engineering departments within the organization respectively.

Users of systems 104 and 108 may then customize the deployed application to suit their needs (step 410). In one embodiment, the customizations that a customizer can make are controlled by the customization parameters set by the application developer. A customizer can only customize those portions of an application that are marked as customizable by the application developer. Further the degree of customization is also restricted to that set by the application developer. In one embodiment, a customizer may use a tool such as an IDE to customize the application. For example, a user of system 104 may use IDE 118 provided by system 104 to customize the base application received from system 102.

In one embodiment, a special role may be provided by IDE 118 to identify a customizer. A user who logins in to the IDE in the special role can customize the application. For example, a "Customization Developer" role may be provided by the IDE and a user logged in that role is allowed to customize those portions of an application that are marked as customizable by the application developer. The "Customization Developer" role is thus a special mode during which customizations may be made.

Figure 8:
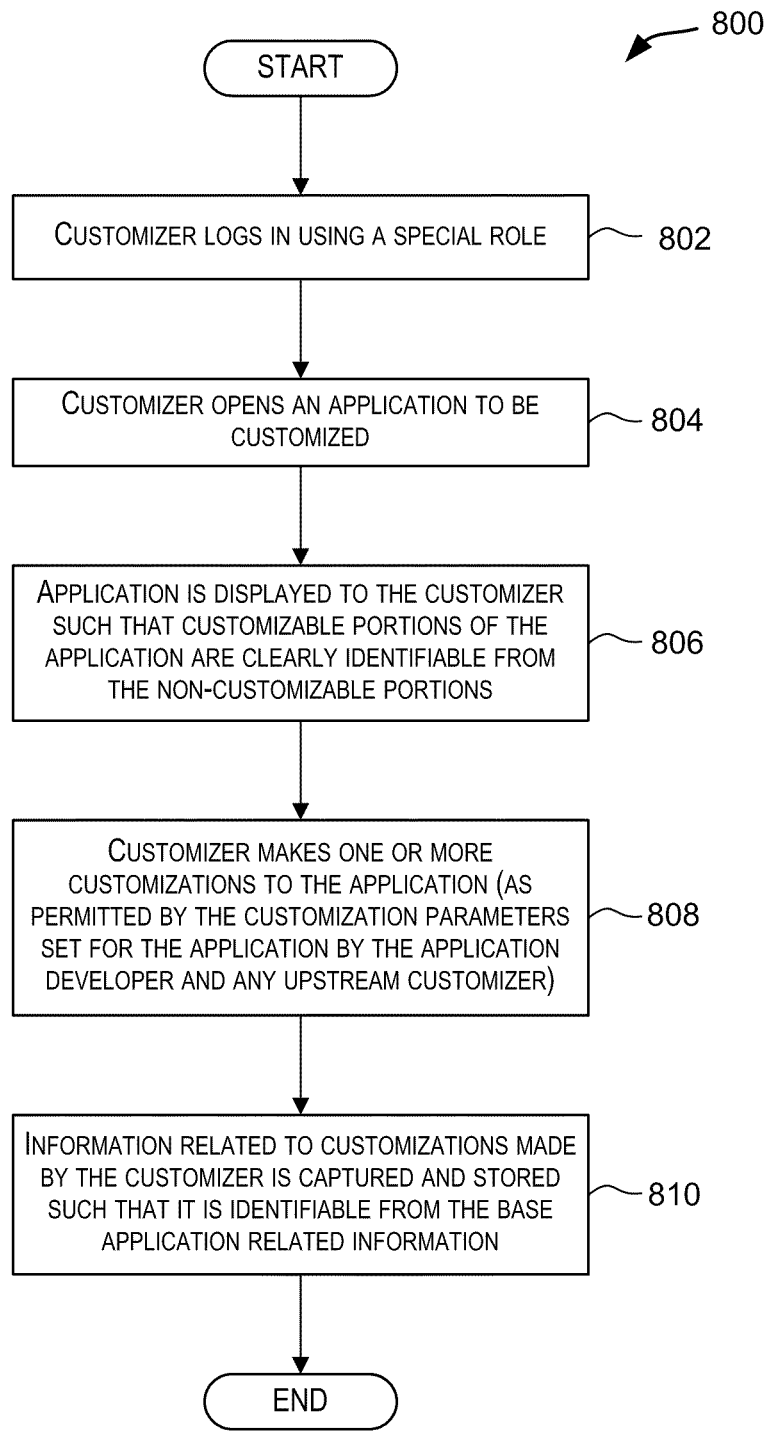
FIG. 8 depicts a simplified flowchart showing activities that may be performed by a customizer according to an embodiment of the present invention.

FIG. 8 depicts a simplified flowchart 800 showing activities that may be performed by a customizer according to an embodiment of the present invention. The processing related to the activities depicted in FIG. 8 may be performed by software (e.g., code, instructions, program) executed by a processor, by hardware, or combinations thereof. The software may be stored on a non-transitory computer-readable medium. The activities depicted in FIG. 8 are only examples and are not intended to limit the scope of embodiments of the present invention as recited in the claims.

As depicted in FIG. 8, a user (customizer) may log into an IDE in a special mode that enables customizations to be made to an application (step 802). For example, the user may log in as a "Customization Developer." The customizer may then open the application to be customized in the IDE (step 804). The IDE may then display the application to be customized in such a manner that customizable portions of the application are clearly distinguishable from the non-customizable portions (step 806). As part of rendering a graphical representation for the application, IDE may determine which portions of the application are customizable/non-customizable based upon customization parameters configured for the application and stored as part of the application metadata information. The IDE may then use different display styles to render portions of the application such that the customizer can easily distinguish customizable portions of the application from the non-customizable portions of the application. For example, elements of the application that are customizable may be displayed using one style while the non-customizable elements of the application may be displayed using a different style that is different from the first style. In one embodiment, elements of the application that are not customizable may be grayed out.

The customizer may then customize the application within the customization parameters set by the application developer or an upstream customizer (step 808).

Information related to one or more customizations made by the customizer (also referred to as delta information) to the base application are then captured and stored such that the customizations made by the customizer can be determined from the base application information (step 810). In one embodiment, the IDE used to make the customizations may be configured to capture the customizations-related information (delta information) and store it in such a way that is it readily identifiable from the base application related information. For example, the IDE may be configured to, for customizations made by a user logged in under the "Customization Developer" role, capture and store the customization information and store the information in a separate file that is associated with the application.

In the embodiment depicted in FIG. 1, customization information 120 represents information related to customizations (to one or more elements of the application) made to the base application by a customizer using system 104. Customization information 120 may be stored in a memory 124 of system 104.

There are different ways in which the customization or delta information may be stored for an application such that it is identifiable from the base application information. In one embodiment, the customization information is stored separately from the information related to the base application (as shown in FIG. 1 where customization information 120 is stored separately from base application information 122). For example, the information related to customizations made to an application may be stored in one or more companion files (referred to as delta files). In one embodiment, a single delta file may store information related to all the customizations made to one or more elements of the application. In another embodiment, a separate delta file may be stored for each element that is customized. For example, a BPEL component that is customized may have its separate delta file comprising information related to customizations made to the BPEL component. For example, metadata information for a BPEL component may be stored in an associated "*.bpel" file and customization information for the component may be stored in an associated "*.mdx" file. Since customizations for an element may be done at different layers, there may be multiple "*.mdx" files for an element, each mdx file corresponding to a particular customization layer.

In one embodiment, the delta file(s) may be in XML format. The delta file(s) may be updated each time customizations are made to the application. For example, if a delta file is stored on a per element basis, the file may be updated each time the element is customized.

In one embodiment, the delta information stored for an element comprises (1) change instructions, (2) change location information, and (3) the actual change value. Change instructions identify the nature of the changes made such as whether the element is being deleted, being modified, or another element is being added to the element. The change location information identifies the location of the change. This location information may identify the contextual position of the change. For example, for a BPEL process component comprising a flow of ordered activities, the change location information may identify where in the flow the change has occurred. The change value identifies the actual change that has been made. For example, if the value of a property of a component has been changed, the change value indicates the changed value.

Figure 10:
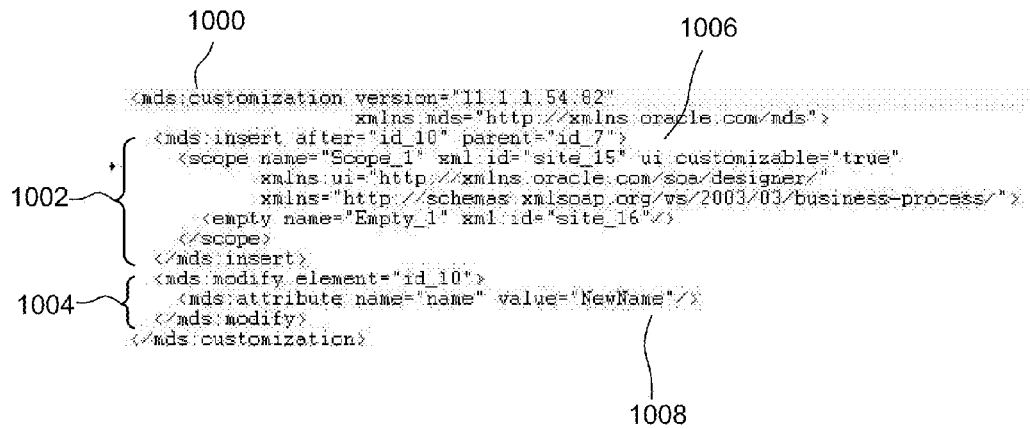
FIG. 10 depicts an example of information that may be stored in a delta file for a customized element of an application according to an embodiment of the present invention.

FIG. 10 depicts an example of information that may be stored in a delta file for a customized element of an application according to an embodiment of the present invention. The delta file depicted in FIG. 10 is stored in XML format. Reference 1000 identifies the element that is customized. For the example depicted in FIG. 10, the customization comprises an insertion and a modification. Reference 1002 points to information that is stored for the insertion. The information includes location information 1006 identifying the location of the insertion. The position may be specified with a combination of parent element identifier, relative position before/after or absolute position. Reference 1004 points to information stored for the modification. This information comprises information 1008 identifying the changed value for an attribute/property of the element.

The delta file may store information for different layers of customization that may have been made to the application.

For example, a sample delta file may store the following information regarding elements which have been changed by layer country:IND.

```
<cust-elements name="CreditService.bpel">
    <elem xmlId="country_27">country:IND</elem>
    <elem xmlId="country_36">country:IND</elem>
    <elem xmlId="country_28">country:IND</elem>
    <elem xmlId="country_32">country:IND</elem>
    <elem xmlId="country_33">country:IND</elem>
    <elem xmlId="country_34">country:IND</elem>
    <elem xmlId="country_35">country:IND</elem>
    <elem xmlId="country_30">country:IND</elem>
    <elem xmlId="id_18">country:IND</elem>
    <elem xmlId="id_17">country:IND</elem>
    <elem xmlId="country_31">country:IND</elem>
    <elem xmlId="id_1">country:IND</elem>
    <elem xmlId="country_29">country:IND</elem>
</cust-elements>
```

As shown above, the information stored in the delta file identifies elements of the application that have been changed, the customized values, and also the customization layer.

In another embodiment, attributes associated with the application may be used to store information (delta information) related to customizations made to the application. For example, in one embodiment, the elements of the application may each have one or more associated attributes that capture the customizations made to the elements. These attributes may then be used to identify portions of the application that have been customized.

The customizations made by one customizer may be different from the customizations made by another customizer. For example, referring back to FIG. 1, the customizations made by a user using system 104 to the base application may be different from the customizations made by a user of system 108. Accordingly, customization information 120 may be different from customization information 123.

Referring back to FIG. 4, a customizer may also further restrict the customizations that can be made to the application (step 412). The restrictions on customizability imposed by a customizer affect the customizations that can be made to the application by a downstream customizer (i.e., by a customizer that customizes the application after the present customizer). The customizer can do this by setting the customization parameters for the application. It should be noted that a customizer can narrow down the customization scope of an application but cannot expand the customization scope beyond what is allowed by the application developer (or another upstream customizer). For example, for an element is marked as customizable by the application developer, a customizer can make that element non-customizable for customizers that are downstream from that customizer. However, a particular customizer cannot make an element, which has been tagged as non-customizable by the application developer or by an upstream customizer, as customizable. In this manner, a customizer can only narrow down the customization scope for an application for downstream customizers but cannot expand the customization scope. The customization parameters set by a customizer may be stored as part of base application information 127.

Referring back to FIG. 4, a package may then be created for the customized application (step 414). In one embodiment, the process of creating a package involves performing merge processing, validation of the application, and compilation of the application. A merging process may be executed as part of 414 that merges the base application with the customizations made by the customizer to create a new customized application. This new customized application represents the base application for the next downstream customizer.

The application may also be validated as part of the processing in 414. Validation processing may comprise performing syntactic validations and semantic validations on the application. Different validation techniques may be used for the different elements of the application. For example, the validation technique used for a BPEL component may be different from the validation performed for another non-BPEL component.

The application may also be compiled as part of 414. In one embodiment, the compilation for a composite application may comprise generating executable representations for the components of the composite. The compilation process for compiling a component may depend upon the technology used to implement the component. Since components of a composite application can be implemented using different technologies, the compilation process used for one component may be the same as or different from the compilation process used for another component of the application. The executable representations generated as a result of the compilations may also be different for different components of the application based upon the implementation technologies. For example, a BPEL component may get compiled to runtime Java code while a BPMN component may get compiled to a BPMN executable.

The package prepared in 414 includes information that may be used to identify customizations made to the base application. As previously described, various techniques may be used to store information that can be used to distinguish customized portions of an application including one or more delta files, attributes associated with elements of the application, and the like.

The package created in 414 may either be delivered to another customizer in the design environment (step 416) or may be deployed to a runtime environment (step 418). If delivered to another customizer (i.e., a downstream customizer), the downstream customizer may then make further customizations to the customized application (per step 410), set customization parameters for the application (per step 412), and the customized application may be packaged (per step 414) and delivered to yet another customizer or deployed to a runtime environment. In this manner, the application may be customized by multiple downstream customizers. For example, as depicted in FIG. 1, a package 126 may be created at system 104 and then delivered to system 106. A customizer at system 106 may then make further customizations to the application within the customization parameters set by the application developer and upstream customizer of system 104.

If the package is deployed to a runtime environment per 418, the application may be executed in the runtime environment (step 420). For example, as shown in FIG. 1, package 130 generated by system 106 may be deployed to runtime environment 112. Likewise, a package 128 generated by system 108 may be deployed to runtime environment 110.

Figure 14:
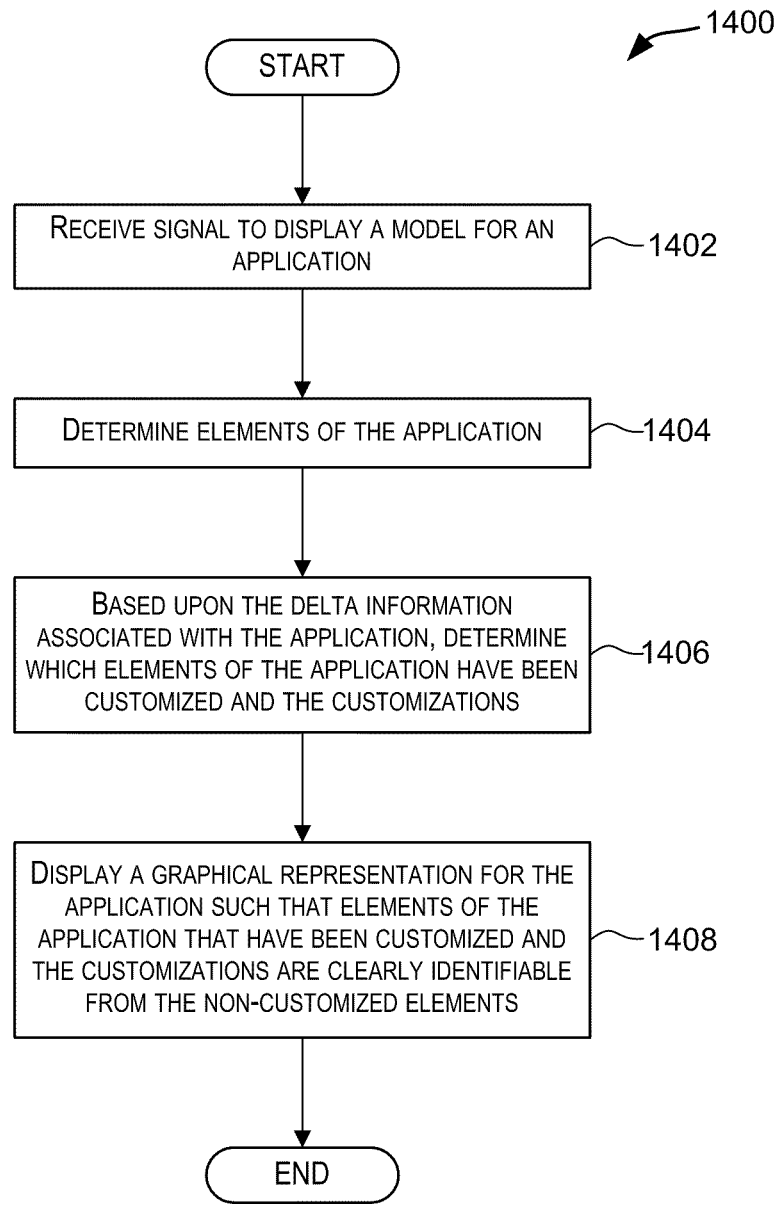
FIG. 14 depicts a simplified flowchart that may be performed to display a graphical representation for an application in a design environment such that elements of the application that have been customized are clearly identifiable according to an embodiment of the present invention.

As described above, when an application element is customized, information related to the customizations may be stored in such a way that customizations that have been made to a base application can be easily determined. In the design-time environment, a tool as the IDE (e.g., JDeveloper) may use the delta information to render a graphical representation of the application in such a way that elements of the application that have been customized are easily identifiable. Different styles (e.g., characters, fonts, colors, etc.) may be used to visually differentiate elements of an application that have been customized. FIG. 14 depicts a simplified flowchart 1400 that may be performed to display a graphical representation for an application in a design environment such that elements of the application that have been customized are clearly identifiable according to an embodiment of the present invention. The processing depicted in FIG. 14 may be performed by software (e.g., code, instructions, program) executed by a processor, by hardware, or combinations thereof. The software may be stored on a non-transitory computer-readable medium. The processing depicted in FIG. 14 is merely an example and is not intended to limit the scope of embodiments of the present invention as recited in the claims.

As depicted in FIG. 14, processing may be initiated upon receiving a signal to display a model for a composite application (step 1402). For example, an IDE may receive the signal when a user selects a particular composite application and requests the IDE to open the composite in the design environment. Based upon the metadata associated with the application, the IDS may then determine the elements of the application (step 1404). For example, in 1404, the IDE may determine the components included in the composite, wiring between the elements, and the like. The IDE may then determine, based upon the delta information associated with the application (which may be stored as part of the metadata for the application), elements of the application that have been customized and the customizations (step 1406). The IDE may then display a graphical representation for the application such that elements of the application that have been customized and the customizations that have been made are clearly identifiable from the non-customized elements (step 1408). Different styles may be used to render the customized elements and the customizations such that they are identifiable. In this manner, based upon the delta information associated with an application, the rendering of the application identifies those elements that have been customized and also the customizations.

Figure 9A:
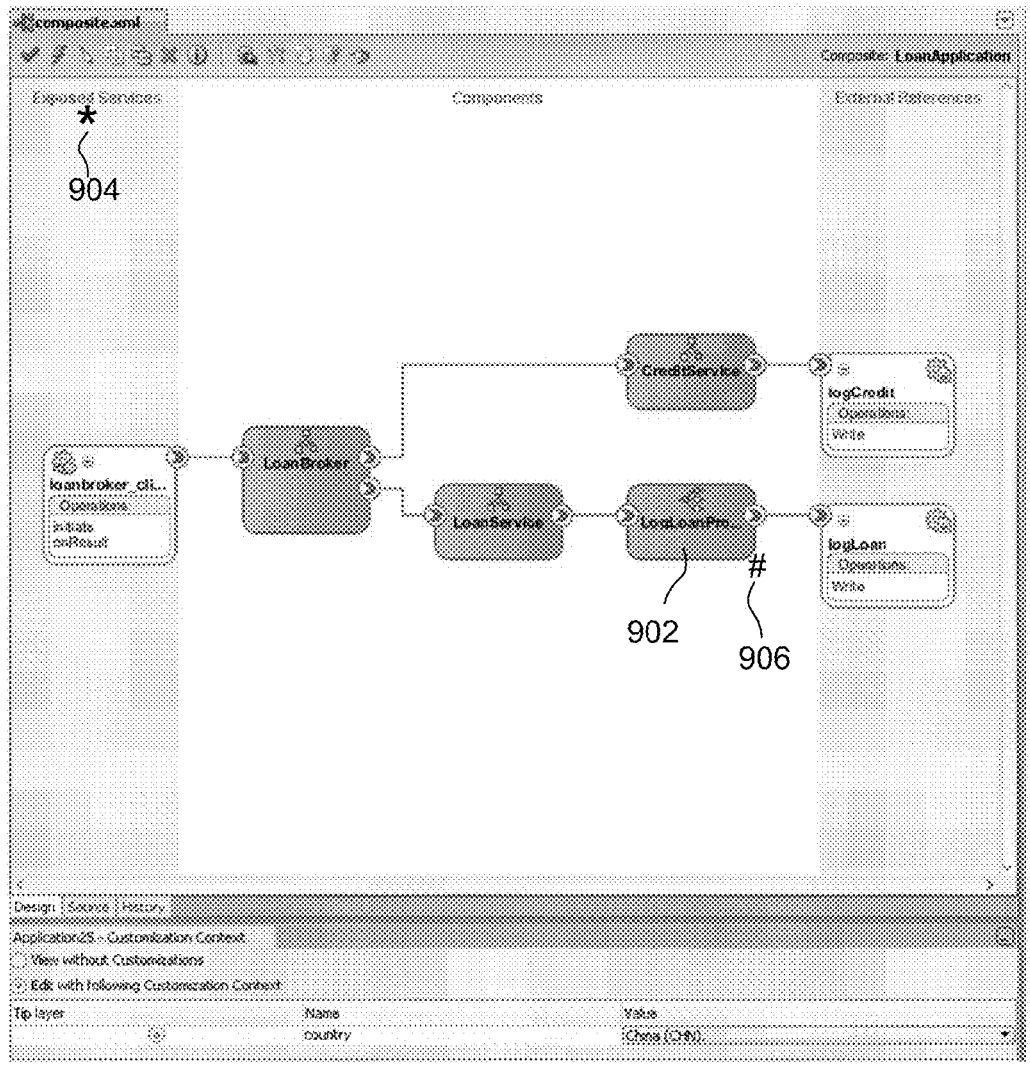
FIGS. 9A and 9B depict examples of how customized elements of an application may be displayed in a design-time environment according to an embodiment of the present invention.
Figure 9B:
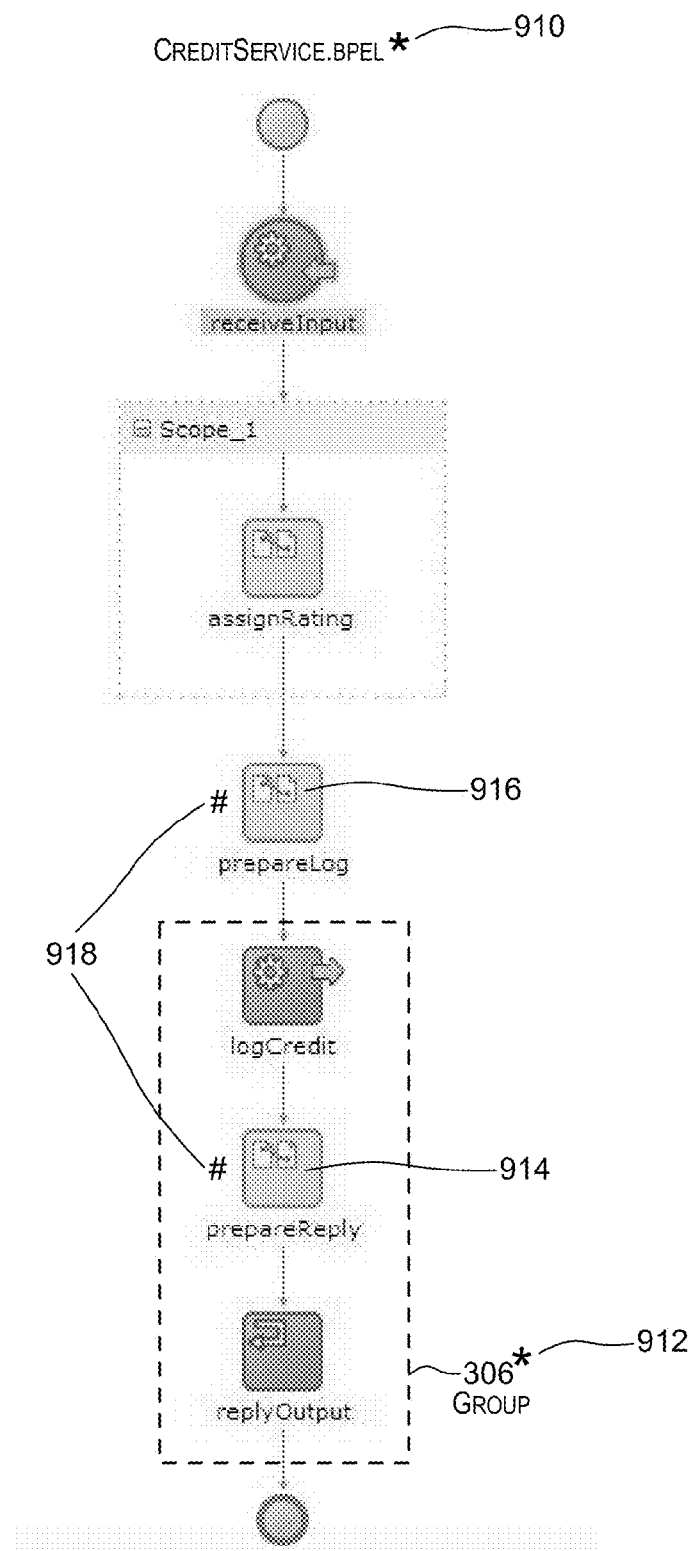

FIGS. 9A and 9B depict examples of how customized elements of an application may be displayed in a design-time environment according to an embodiment of the present invention. Referring back to FIG. 6A, the composite depicted in the figure was tagged as being customizable. FIG. 9A depicts a customized version of the composite depicted in FIG. 6A in that a new component "LogLoanProxy" 902 has been added to the composite. An asterix "*" is displayed proximal to the composite to indicate that it has been customized. Further, a hash symbol "#" 906 is also displayed to identify the customization.

Referring back to FIGS. 6A and 6B, component CreditService and group 306 within the CreditService component are both tagged as being customizable. FIG. 9B depicts a customized version of the component. As depicted in FIG. 6A, a new activity 916 has been added to the CreditService component and another new activity 914 has been added to group 306 within the CreditService component. Accordingly, an asterisk "*" 910 is displayed proximal to the CreditService component to indicate that it has been customized and an asterisk "*" 912 has been placed proximal to group 306 to indicate that it has been customized. Hashes "#" 918 are displayed next to the customizations.

Although the design-time and runtime systems are shown as being separate in FIG. 1, in alternative embodiments a design-time system may be the same as a runtime system. Further, a system used by application developer may be the same as or different from a system used by a downstream customizer.

A runtime environment system may comprise execution engines (e.g., execution engines 132 and 134 depicted in FIG. 1) that execute the executable representations (e.g., code, instructions, programs, etc.) included in the deployed application package. The execution of the application may process data accessible to the runtime system. The data that is processed may be stored in a database (e.g., databases 136 and 138 depicted in FIG. 1).

In one embodiment, a runtime system provides tools that facilitate runtime monitoring of the executing application. For example, a runtime system may comprise a monitor module (e.g., modules 140 and 142 depicted in FIG. 1) that enables a user in the runtime environment to monitor the execution of the application. The runtime monitor module may provide a graphical user interface (GUI) that is configured to display the execution status of the application. As part of displaying the execution status, the GUI may display elements of the application that are being or have been executed. In one embodiment, the application may be displayed in such a way that the customized portions (e.g., elements) of the application are clearly distinguishable from the base application.

In one embodiment, a runtime monitor module may use the delta information stored for the application to identify and display the customized portions of the application. For example, delta files or attributes associated with elements of the application that are used to store the customization information may be used by the runtime monitor module to identify and display the customized portions of an application. In this manner, information associated with the application that identifies customizations made to the application is consumed by the runtime monitoring module to display the application such that customized portions of the application are clearly identifiable during runtime execution of the application.

Figure 15:
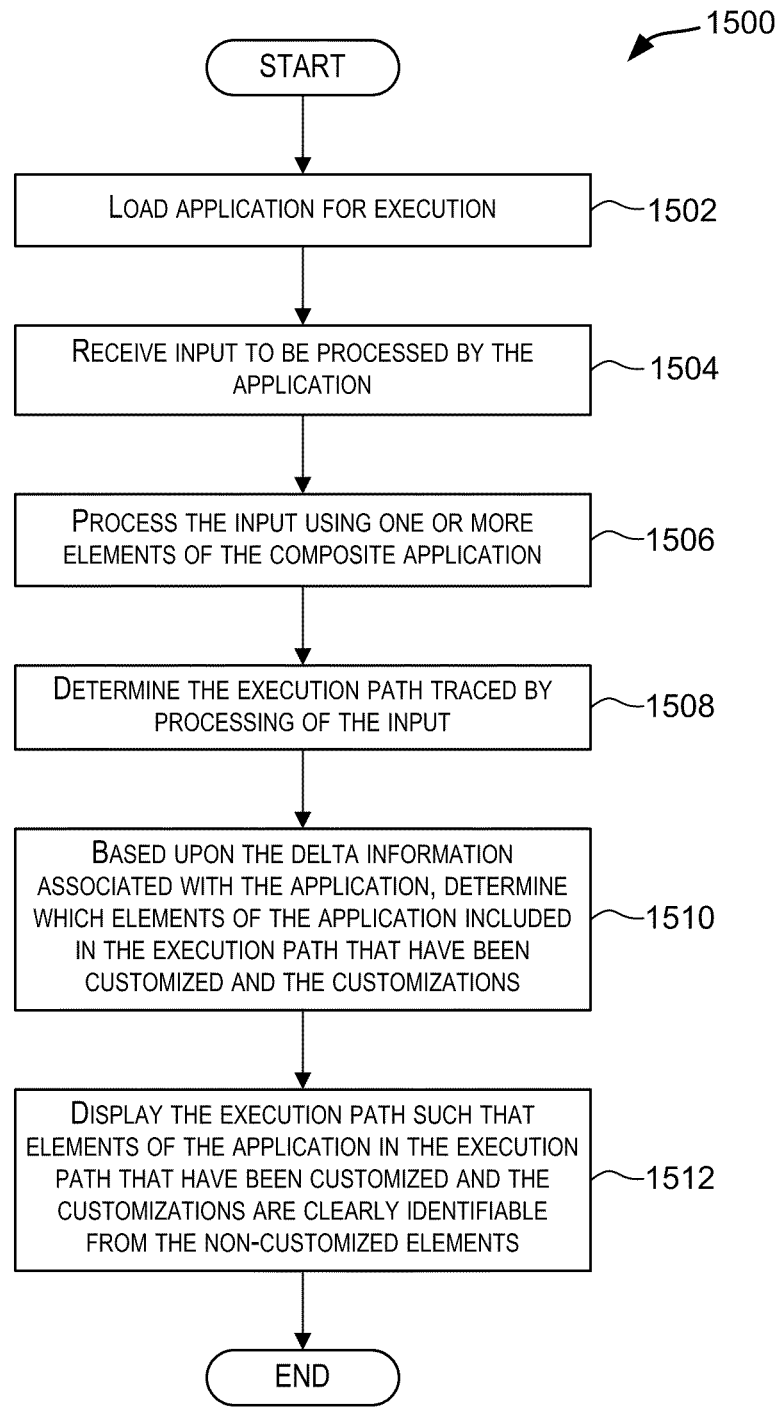
FIG. 15 depicts a simplified flowchart that may be performed by a runtime monitor module to display a graphical representation for a runtime execution of an application according to an embodiment of the present invention.

FIG. 15 depicts a simplified flowchart 1500 that may be performed by a runtime monitor module to display a graphical representation for a runtime execution of an application according to an embodiment of the present invention. The processing depicted in FIG. 15 may be performed by software (e.g., code, instructions, program) executed by a processor, by hardware, or combinations thereof. The software may be stored on a non-transitory computer-readable medium. The processing depicted in FIG. 15 is merely an example and is not intended to limit the scope of embodiments of the present invention as recited in the claims.

As depicted in FIG. 15, the composite application to be executed may be loaded in the runtime environment (step 1502). An input (e.g., an input message) may be received to be processed by the application (step 1504). The input may then be processed by one or more elements of the composite application (step 1506). The runtime monitor module may then determine the execution path traced by processing of the input (step 1508). As part of 1508, the runtime monitor module may determine the flow of the input through the composite application and the elements of the composite application that process the input. Then, based upon the delta information associated with the application, the runtime monitor module determines those elements in the execution that have been customized and the customizations (step 1510). The runtime monitor module may then display the execution path such that elements of the application that have been customized and the customizations that have been made are clearly identifiable from the non-customized elements (step 1512). Different styles may be used to render the customized elements and the customizations such that they are identifiable as being customized.

Figure 16A:
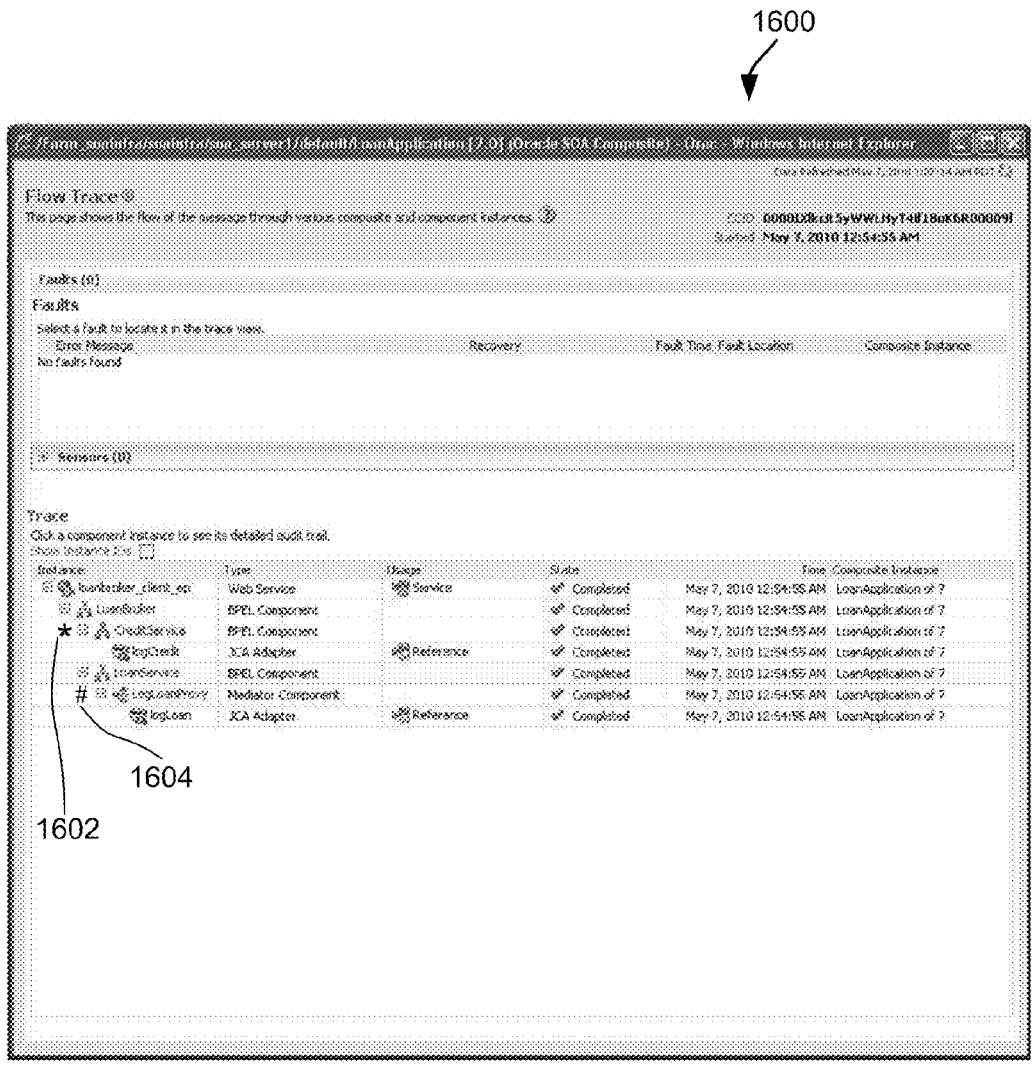
FIGS. 16A and 16B depict graphical user interfaces (GUIs) that may be displayed by a runtime monitor module to display execution paths according to an embodiment of the present invention.
Figure 16B:
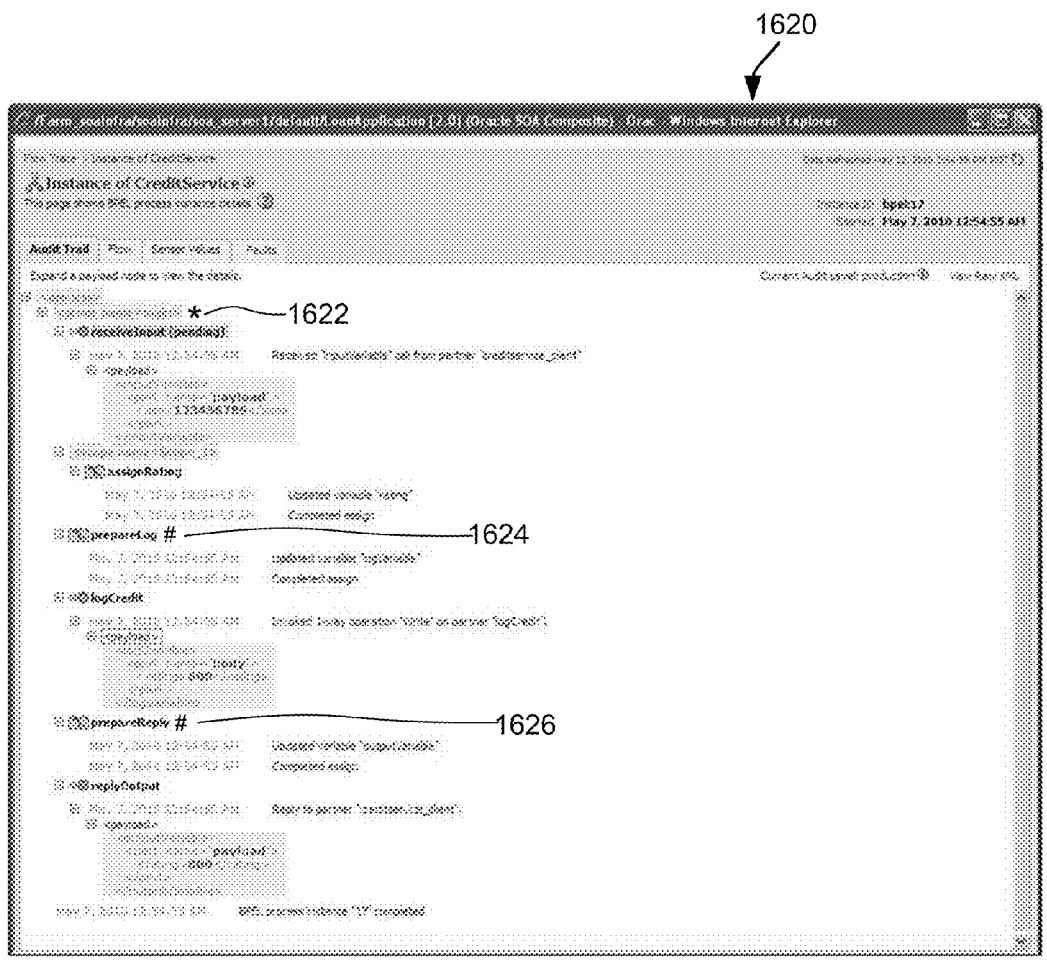

FIGS. 16A and 16B depict graphical user interfaces (GUIs) that may be displayed by a runtime monitor module to display execution paths according to an embodiment of the present invention. GUI 1600 depicted in FIG. 16A depicts a runtime execution path for processing a received input for the application depicted in FIGS. 9A and 9B. As can be seen from FIG. 16A, the input has been processed by the following elements of the application: LoanBroker component, CreditService component, logCredit activity within the CreditService component, LoanService component, the LogLoanProxy component, and the logLoan activity within the LogLoanProxy component. An asterix "*" 1602 is displayed next to the CreditService component to indicate that it has been customized. A hash "#" 1604 is displayed next to the LogLoanProxy component to indicate that it is a customization. In this manner, GUI 1600 displays both what has been customized and the customizations.

FIG. 16B depicts a GUI 1620 that may be displayed by a runtime monitor module for depicting an execution path within a BPEL component according to an embodiment of the present invention. The execution path depicted in FIG. 16B corresponds to the BPEL component CreditService depicted in FIG. 9B. As can be seen from FIG. 16B, the input has been processed by the following activities of component CreditService: receiveInput, assignRating, prepareLog, logCredit, prepareReply, and replyOutput. An asterix "*" 1622 is displayed at the top to indicate that the CreditService component has been customized. A hash "#" 1624 is displayed next to the prepareLog activity to identify it as a customization. A hash "#" 1626 is displayed next to the prepareReply activity to identify it as a customization. In this manner, GUI 1620 displays both what has been customized and the customizations.

As described above with respect to 414 in FIG. 4, in one embodiment, a merging process is executed as part of 414 to merge the customizations with the base application to create a customized application. In one embodiment, the merging process is also executed when the application has to be rendered, for example, when an IDE renders the application. The IDE is configured to merge the changes with the base application and render a unified view to the user of the IDE. Further, since the IDE has knowledge of what information is coming from delta information as opposed to the base application information, it can render the application such that portions of the application that are customized can be rendered in such a way that they are clearly identifiable from the base application portions. In this manner, a user of the IDE is able to easily see the base application portions and the customized portions of the application.

Figure 11:
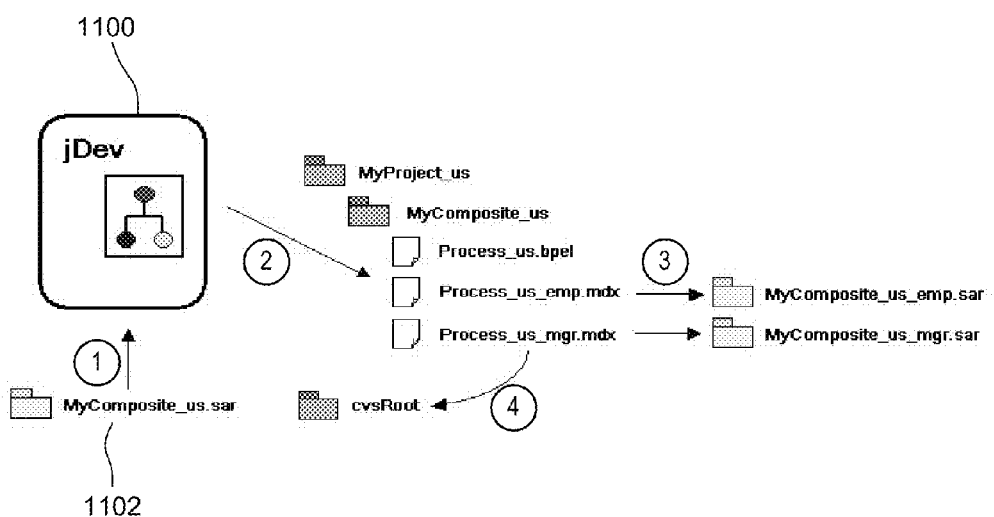
FIG. 11 depicts a high-level workflow for customizing an application according to an embodiment of the present invention.

FIG. 11 depicts a high-level workflow for customizing an application according to an embodiment of the present invention. As depicted in FIG. 11, in (1) a customizer may use an IDE (such as JDeveloper) 1100 to open an application package "MyComposite_us.sar" 1102 comprising an application to be customized. Package 1102 may have been received from an application developer or from an upstream customizer. The customizer may log into IDE 1100 in a special mode to enable customization of the application. The base application may comprise a composite (represented by "MyComposite_us") having a BPEL process component (represented by "Process_us.bpel"). In (2), customizations may be made to the application and stored as layers (*.mdx files) separate from the base application information (.bpel etc.). For example, if the base application ("MyComposite_us") is for a hiring process and comprises a BPEL component implementing the hiring process, the delta file "Process_us_emp.mdx" may store customizations made to the BPEL component for hiring employees while the delta file "Process_us_emp.mdx" may store customizations made to the BPEL component for hiring managers. New elements added as part of the customization may also be stored separately. In (3), two packages may be created, one ("MyComposite_us_emp.sar") for the employee hiring process and another ("MyComposite_us_mgr.sar") for manager hiring. As part of preparing the packages, the customizations and the base application elements may be merged to create customized applications. If the packages are deployed to a runtime environment, the runtime environment monitoring module is able to determine the customizations made to the base application from the delta information and display the application such that the customized portions are identifiable from the base application. In (4), the layers can be stored in source control so that they can be reapplied on new versions of the base. Any validation errors encountered during application of a customization to a new version will be flagged—these can be fixed in JDeveloper.

As part of the life cycle of an application, an application developer may release new versions of an application. For example, a new application version may be released to correct bugs in a previous version, to enhance features provided by the previous version, to add new features to the previous version of the application, and the like. In one embodiment, when a new version of the base application (e.g., a base process) is sent to a site where the base application has been customized (i.e., to a customizer site), a patching task (also referred to as import task) is performed at the customizer site to integrate the new version with the previous customizations made by the customizer to the previous version(s) of the application.

Figure 12:
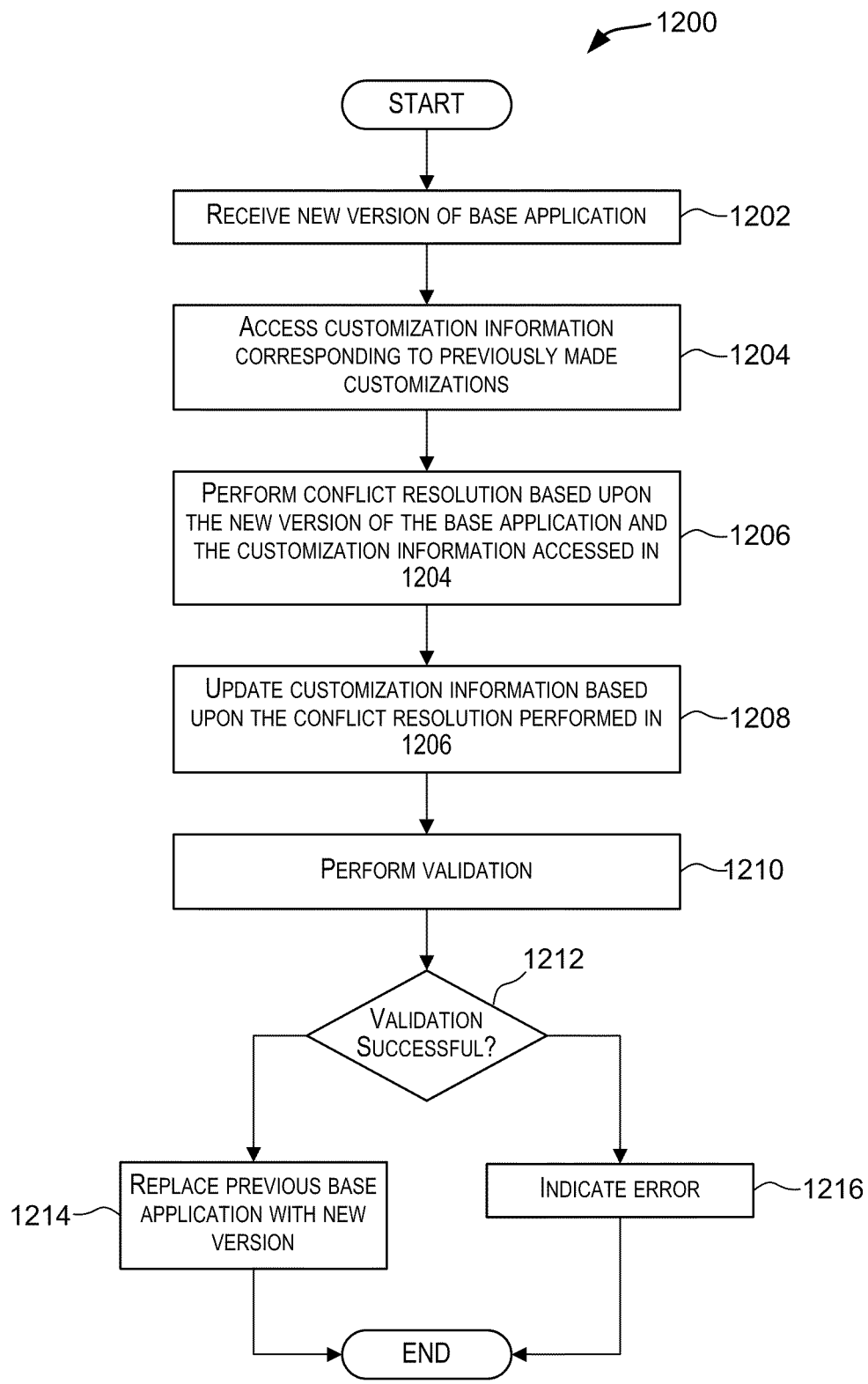
FIG. 12 depicts a simplified flowchart depicting processing performed during an import activity according to an embodiment of the present invention.

FIG. 12 depicts a simplified flowchart 1200 depicting processing performed during an import activity according to an embodiment of the present invention. The processing depicted in FIG. 12 may be performed by software (e.g., code, instructions, program) executed by a processor, by hardware, or combinations thereof. The software may be stored on a non-transitory computer-readable medium. The flowchart depicted in FIG. 12 is only an example and is not intended to limit the scope of embodiments of the present invention as recited in the claims.

For the embodiment depicted in FIG. 12, it is assumed that the import task is triggered as a result of receiving a new version of the base application (step 1202).

Information related to previous customizations for the application is accessed (step 1204). As described above, when customizations are made to the application, the customizations information is stored in a manner that allows it to be readily identified from the base application information. This enables the customization information to be readily indentified and accessed in 1204. For example, in embodiments where the customization information is stored in delta files separate from the base application information, the delta files may be accessed in 1204.

Conflict resolution is then performed using the new version of the base application received in 1202 and the customization information accessed in 1204 (step 1206). The conflict resolution may be performed in an automated manner or may involve some user interaction. In one embodiment, conflict resolution may be automated by configuring conflict resolution rules.

Such rules may be configured to, upon identification of a conflict, determine a rule for resolving the conflict, and then apply the determined rule to resolve the conflict.

There are various types of conflicts that may be identified between the customization information and the newly received version of the base application. One type of conflict may arise when the same element property has been modified both in the customization information and in the new version. A conflict resolution rule (or user interaction) may be configured to resolve this priority. The conflict resolution rule may, for example, always give priority to the value set in the new version. Another type of conflict may arise when an element that was customizable in the previous application and was modified by the customizer is now tagged as being non-customizable in the new version. Such a conflict may require user interaction. A user may interact with the conflict resolution system to resolve such a conflict. Another type of conflict may occur when an element that has been customized is now not present (i.e., has been deleted) in the new version of the application. User interaction may resolve this conflict. Other types of conflicts may also exist and may be resolved either in an automated manner or involving some user interaction. In this manner, conflict resolution may be automated and/or may involve some user interaction. Accordingly, the processing performed in 1206 comprises identifying conflicts and resolving the conflicts either using a manual process, an automated process, or a combination thereof.

The customization information is then updated based upon the conflict resolution performed in 1206 (step 1208). Validation processing may then be performed for the application using the new version of the application (step 1210). The validation performed in 1210 may include syntactic validation and semantic validation. Different validation techniques may be used for the different elements of the application. In one embodiment, a validation technique (for syntactic and/or semantic validation) may be determined for an element of the application based upon the type of the element. For example, the validation technique used for a BPEL component may be different from the validation performed for a non-BPEL component.

Additionally, there may be application level validator(s) for handling syntactic as well as semantic validations at the application level. For example, in one embodiment, validation is performed to determine whether the new version of the application in combination with the customizations conforms to its intended usage. As an example, a BPEL process can have a new addition of an assign or transform activity but the same assign can get modified in a patch.

A check is then made to see if validation was successful (step 1212). If it is determined in 1212 that validation is successful then the old version of the application may be replaced by the new version of the application received in 1202 (step 1214). The customizer may then make further customizations to the new version of the application. If it is determined in 1212 that validation is not successful, then an error condition may be output to the user (step 1216). In case of an error condition, the previous version of the application may not be replaced by the new version.

Figure 13:
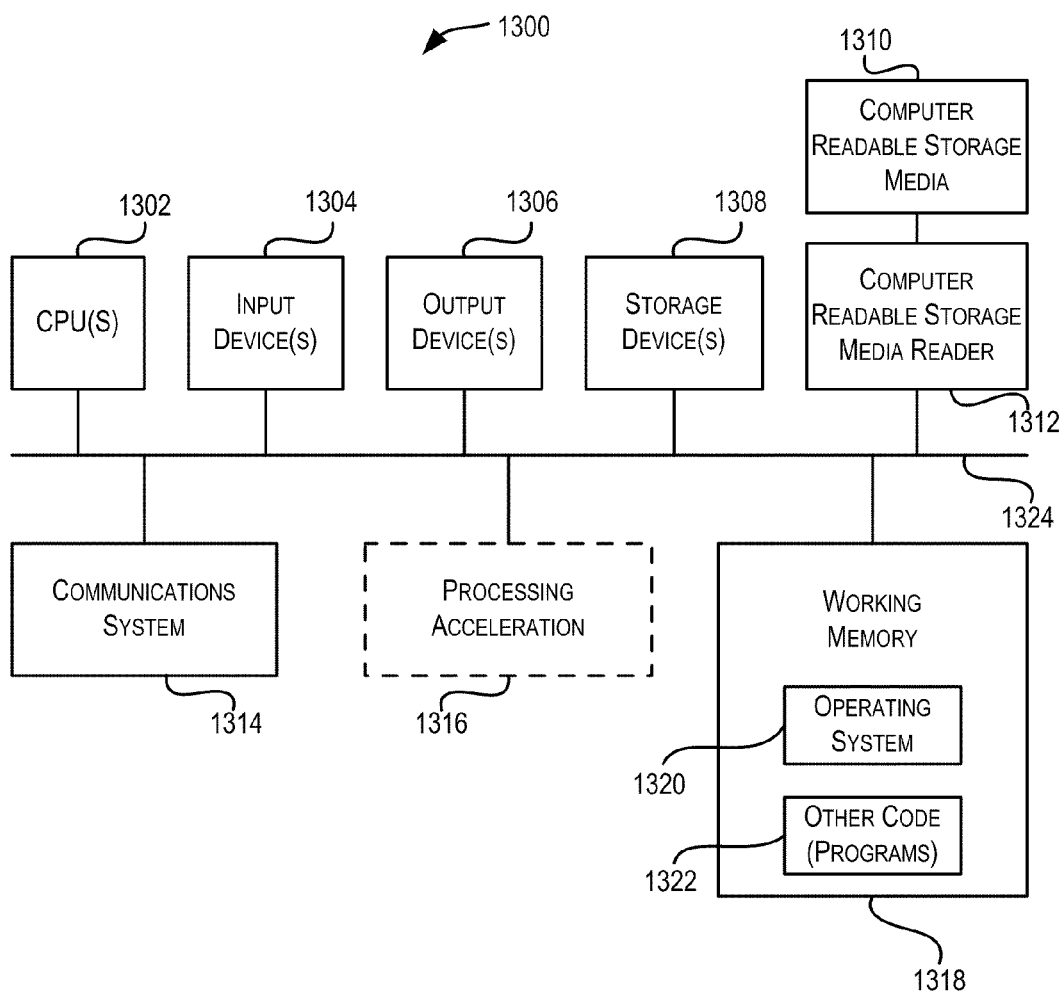
FIG. 13 is a simplified block diagram illustrating physical components of a computer system that may incorporate an embodiment of the present invention.

FIG. 13 is a simplified block diagram illustrating physical components of a computer system 1300 that may incorporate an embodiment of the present invention. Computer system 1300 may for example be used to execute an IDE such as JDeveloper. Computer system 1300 may also run any of a variety of server applications and/or mid-tier applications, including web servers, Java virtual machines, application servers, database servers, and the like. Computer system 1300 may be used as any of the systems depicted in FIG. 1.

As shown in FIG. 13, computer system 1300 comprises hardware elements that may be electrically coupled via a bus 1324. The hardware elements may include one or more central processing units (CPUs) 1302, one or more input devices 1304 (e.g., a mouse, a keyboard, etc.), and one or more output devices 1306 (e.g., a display device, a printer, etc.). Computer system 1300 may also include one or more storage devices 1308. By way of example, storage device(s) 1308 may include devices such as disk drives, optical storage devices, and solid-state storage devices such as a random access memory (RAM) and/or a read-only memory (ROM), which can be programmable, flash-updateable and/or the like.

Computer system 1300 may additionally include a computer-readable storage media reader 1312, a communications subsystem 1314 (e.g., a modem, a network card (wireless or wired), an infra-red communication device, etc.), and working memory 1318, which may include RAM and ROM devices as described above. In some embodiments, computer system 1300 may also include a processing acceleration unit 1316, which can include a digital signal processor (DSP), a special-purpose processor, and/or the like.

Computer-readable storage media reader 1312 can further be connected to a computer-readable storage medium 1310, together (and, optionally, in combination with storage device(s) 1308) comprehensively representing remote, local, fixed, and/or removable storage devices plus storage media for temporarily and/or more permanently containing computer-readable information.

Communications system 1314 may permit data to be exchanged with a network or other computer systems. The network may be any type of network that can support data communications using any of a variety of commercially-available protocols, including without limitation TCP/IP, SNA, IPX, AppleTalk, and the like. Merely by way of example, network may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks. Various different communication protocols may be used.

Computer system 1300 may also comprise software elements, shown as being currently located within working memory 1318, including an operating system 1320 and/or other code 1322, such as an application program (which may be a client application, Web browser, mid-tier application, RDBMS, etc.). It should be appreciated that alternative embodiments of computer system 1300 may have numerous variations from that described above. For example, customized hardware might also be used and/or particular elements might be implemented in hardware, software (including portable software, such as applets), or both. Further, connection to other computing devices such as network input/output devices may be employed.

In one set of embodiments, the techniques described herein may be implemented as program code or instructions executable by a computer system (such as a computer system 1300) and may be stored on a computer- or machine-readable storage media. Machine-readable storage media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A non-transitory computer-readable storage medium storing a plurality of instructions for controlling a processor, the plurality of instructions comprising:
    instructions that cause the processor to enable customizability parameters to be configured for a hierarchy of elements of an application including at least a first element and a second element that is descended from the first element, wherein each element of the application is associated with a customizability parameter that indicates whether the associated element is customizable, and wherein the customizability parameter is automatically inherited by descendants of the element;
    instructions that cause the processor to identify a subset of elements of the hierarchy of elements as being customizable,
        wherein each element in the subset of elements is associated with a customizability parameter that indicates that the element is customizable, and
        wherein any customizability parameter inherited by an element in the subset of elements indicates that the element is customizable; and
    instructions that cause the processor allow each element in the subset of elements to be customized.

2. The non-transitory computer-readable storage medium of claim 1 wherein the first element is a composite element and the second element is a component element.

3. The non-transitory computer-readable storage medium of claim 2 wherein the component element is implemented using Business Process Execution Language (BPEL), Business Process Modeling Notation (BPMN), XML Schema Definition (XSD), Web Services Definition Language (WSDL), Extensible Stylesheet Language (XSL), or an XML-expressed model.

4. The non-transitory computer-readable storage medium of claim 1 wherein the first element is a component element and the second element is a group of one or more activities in the component element.

5. The non-transitory computer-readable storage medium of claim 1 wherein the first element is a first group of one or more activities and the second element is a second group of one or more activities.

6. The non-transitory computer-readable storage medium of claim 1 wherein the application is developed using a Service Component Architecture (SCA) framework.

7. The non-transitory computer-readable storage medium of claim 1 wherein the plurality of instructions further comprises:
    instructions that cause the processor to receive a set of customizations made to the first element or the second element; and
    instructions that cause the processor to store the set of customizations along with data related to the application such that the set of customizations is determinable from the data related to the application.

8. The non-transitory computer-readable storage medium of claim 1 wherein the plurality of instructions further comprises:
    instructions that cause the processor to determine a conflict based upon a customization made to the application and a new version of the application;
    instructions that cause the processor to enable the conflict to be resolved; and
    instructions that cause the processor to perform validation based upon the customization made to the application and the new version of the application.

9. A system comprising:
    a memory configured to store data for an application, the application comprising a hierarchy of elements including at least a first element and a second element, wherein the second element is descended from the first element; and
    a processor communicatively coupled with the memory, the processor configured to:
        enable customizability parameters to be configured for each element in the hierarchy of elements, wherein each element of the application is associated with a customizability parameter that indicates whether the associated element is customizable, and wherein the customizability parameter is automatically inherited by descendants of the element;
        identify a subset of elements of the hierarchy of elements as being customizable,
            wherein each element in the subset of elements is associated with a customizability parameter that indicates that the element is customizable, and
            wherein any customizability parameter inherited by an element in the subset of elements indicates that the element is customizable; and
        allow each element in the subset of elements to be customized.

10. The system of claim 9 wherein the first element is a composite element and the second element is a component element.

11. The system of claim 10 wherein the component element is implemented using Business Process Execution Language (BPEL), Business Process Modeling Notation (BPMN), XML Schema Definition (XSD), Web Services Definition Language (WSDL), Extensible Stylesheet Language (XSL), or an XML-expressed model.

12. The system of claim 9 wherein the first element is a component element and the second element is a group of one or more activities in the component element.

13. The system of claim 9 wherein the first element is a first group of one or more activities and the second element is a second group of one or more activities.

14. The system of claim 9 wherein the processor is configured to:
receive a set of customizations made to the first element or the second element; and
store the set of customizations in the memory along with data related to the application such that the set of customizations is determinable from the data related to the application.

15. The system of claim 9 wherein the processor is configured to:
determine a conflict based upon a customization made to the application and a new version of the application;
enable the conflict to be resolved; and
perform validation based upon the customization made to the application and the new version of the application.

16. A method comprising:
enabling, by a processing system, customizability parameters to be configured for a hierarchy of elements of an application including at least a first element and a second element that is descended from the first element, wherein each element of the application is associated with a customizability parameter that indicates whether the associated element is customizable, and wherein the customizability parameter is automatically inherited by descendants of the element;
identifying, by the processing system, a subset of elements of the hierarchy of elements as being customizable,
wherein each element in the subset of elements is associated with a customizability parameter that indicates that the element is customizable, and
wherein any customizability parameter inherited by an element in the subset of elements indicates that the element is customizable; and
allowing each element in the subset of elements to be customized.

17. The method of claim 16 wherein the first element is a composite element and the second element is a component element.

18. The method of claim 16 wherein the first element is a component element and the second element is a group of one or more activities in the component element.

19. The method of claim 16 further comprising:
receiving a set of customizations made to the first element or the second element; and
storing the set of customizations along with data related to the application such that the set of customizations is determinable from the data related to the application.

20. The method of claim 16 further comprising:
determining a conflict based upon a customization made to the application and a new version of the application;
enabling the conflict to be resolved; and
performing validation based upon the customization made to the application and the new version of the application.

* * * * *

UNITED STATES PATENT AND TRADEMARK OFFICE
CERTIFICATE OF CORRECTION

| | | |
|---|---|---|
| PATENT NO. | : 8,869,108 B2 | Page 1 of 1 |
| APPLICATION NO. | : 12/790437 | |
| DATED | : October 21, 2014 | |
| INVENTOR(S) | : Utschig-Utschig et al. | |

It is certified that error appears in the above-identified patent and that said Letters Patent is hereby corrected as shown below:

On The Title Page, item (56)

On page 4, column 1, under Other Publications, lines 32-33, delete "<http:/ /wi ndowsco n nected. co m/b logs/jerry/arch ive" and insert -- <http://windowsconnected. com/blogs/jerry/archive --, therefor.

On page 4, column 1, under Other Publications, line 33, delete "fi l e-and-reg istry-vi rtual izatio n-th e-good-th ebad-" and insert -- file-and-registry-virtualization-the-good-the-bad- --, therefor.

In The Specification

In column 22, lines 47-48, delete "indentified" and insert -- identified --, therefor.

In column 22, lines 59-61, delete "Such rules may be configured... determined rule to resolve the conflict." and insert the same on Col. 22, Line 58, as the continuation of the same Paragraph.

In column 23, lines 32-39, delete "Additionally, there may be application... assign can get modified in a patch." and insert the same on Col. 23, Line 31, as the continuation of the same Paragraph.

Signed and Sealed this
Twenty-third Day of June, 2015

Michelle K. Lee
*Director of the United States Patent and Trademark Office*